(12) United States Patent
Angara

(10) Patent No.: US 9,950,655 B2
(45) Date of Patent: Apr. 24, 2018

(54) PORTABLE CARRIER FOR HOLDING BAGS OR HOLDING DISPLAYS ON VEHICLES

(71) Applicant: Siddhartha Angara, Alpharetta, GA (US)

(72) Inventor: Siddhartha Angara, Alpharetta, GA (US)

(73) Assignee: Siddhartha Angara, Cumming, GA (US)

( * ) Notice: Subject to any disclaimer, the term of this patent is extended or adjusted under 35 U.S.C. 154(b) by 162 days.

(21) Appl. No.: 14/941,621

(22) Filed: Nov. 15, 2015

(65) Prior Publication Data

US 2016/0068095 A1 Mar. 10, 2016

Related U.S. Application Data

(63) Continuation-in-part of application No. 13/444,844, filed on Apr. 12, 2012, now Pat. No. 9,221,406.

(51) Int. Cl.
*B60P 7/06* (2006.01)
*B60R 13/00* (2006.01)
(Continued)

(52) U.S. Cl.
CPC ........ *B60P 7/06* (2013.01); *B60P 3/00* (2013.01); *B60R 9/06* (2013.01); *B60R 11/00* (2013.01);
(Continued)

(58) Field of Classification Search
CPC B60R 9/06; B60R 9/065; B60R 11/00; B60R 99/00
(Continued)

(56) References Cited

U.S. PATENT DOCUMENTS 1,780,044 A 10/1930 Scholl
2,565,978 A * 8/1951 Meriwether ........... A47K 3/003
248/327
(Continued)

OTHER PUBLICATIONS

Mobitrash Video on website: www.YouTube.com—Video describing the operation of applicant's apparatus, published by applicant, Siddhartha Angara, on Mar. 23, 2014, in the United States of America. To play the video, in the search bar of the website, enter the following keystrokes: "mobitrash hauling your apartment trash" followed by pressing the 'search' button, followed by clicking on the video link that is titled as "MobiTrash™—hauling your apartment trash is now incredibly easy!".

*Primary Examiner* — Brian D Nash

(57) ABSTRACT

An apparatus and related methods for holding bags for transporting trash, or for holding displays, on the exterior of a vehicle. The apparatus includes an adjustable-length strap with a distal end and a proximal end, an engagement loop attached to the proximal end of the strap and at least one hook member attached to the distal end of the strap. The engagement loop is configured into a cow-hitch knot around a fixing means of the vehicle. To adjust the tightness of the cow-hitch knot around the fixing means, an adjustable loop-lock is provided for locking a portion of the cow-hitch knot at a desired position. The hook member consists of one or more hook-shaped, tooth-shaped or claw-shaped projections and is provided with a vacuum suction cup which is secured to a surface on the vehicle to minimize any undesired vertical or lateral movements.

4 Claims, 23 Drawing Sheets

(51) Int. Cl.
  *B60R 9/06* (2006.01)
  *B60P 3/00* (2006.01)
  *B60R 13/10* (2006.01)
  *B60R 11/00* (2006.01)

(52) U.S. Cl.
  CPC .......... *B60R 13/005* (2013.01); *B60R 13/105* (2013.01); *B60R 2011/004* (2013.01); *B60R 2011/0071* (2013.01); *Y10T 29/49716* (2015.01)

(58) Field of Classification Search
  USPC ........................................ 224/513, 514, 517
  See application file for complete search history.

(56) References Cited

U.S. PATENT DOCUMENTS

| | | | |
|---|---|---|---|
| 2,609,104 A * | 9/1952 | Leach .................... | A47G 25/08 211/113 |
| 2,908,522 A * | 10/1959 | Glave .................... | E05C 17/36 217/60 R |
| 3,610,491 A | 10/1971 | Bolt | |
| 3,710,999 A | 1/1973 | Allen | |
| 3,863,728 A | 2/1975 | Mittendorf | |
| 3,923,221 A * | 12/1975 | Ballinger ................ | B60R 9/06 224/42.4 |
| 3,927,811 A | 12/1975 | Nussbaum | |
| 4,011,675 A | 3/1977 | Herring | |
| 4,068,817 A * | 1/1978 | Berger .................... | G09F 7/22 248/303 |
| 4,077,554 A * | 3/1978 | Goode ..................... | B60R 9/12 211/70.5 |
| 4,518,108 A * | 5/1985 | Allen ....................... | B60R 9/06 224/314 |
| 4,561,685 A * | 12/1985 | Fischer .................. | B60R 13/04 280/770 |
| 4,726,499 A | 2/1988 | Voorhees | |
| 4,750,753 A | 6/1988 | Dezern | |
| 5,219,105 A | 6/1993 | Kravitz | |
| 5,230,449 A | 7/1993 | Collins | |
| 5,236,342 A | 8/1993 | Pellettier | |
| 5,289,960 A * | 3/1994 | Kelly ..................... | A63B 47/001 224/235 |
| 5,427,288 A * | 6/1995 | Trubee .................... | B60R 7/02 224/539 |
| 5,433,359 A * | 7/1995 | Flowers ................... | A45F 5/00 224/222 |
| 5,489,111 A | 2/1996 | Collins | |
| 5,528,998 A | 6/1996 | Smith | |
| 5,593,076 A | 1/1997 | Biondo | |
| 5,673,464 A * | 10/1997 | Whittaker .............. | B60P 7/0823 24/301 |
| 5,695,101 A * | 12/1997 | Frietze .................... | A45F 3/14 224/250 |
| 5,803,324 A | 9/1998 | Silberman .............. | B62D 43/04 224/42.23 |
| 5,806,816 A * | 9/1998 | Hull ........................ | B60N 3/00 224/568 |
| 6,131,780 A * | 10/2000 | Becker .................... | A45F 3/04 224/148.6 |
| 6,381,886 B1 | 5/2002 | Chou | |
| 6,412,675 B1 | 7/2002 | Cronin | |
| 6,447,037 B1 * | 9/2002 | Crouch ................... | B65D 33/14 294/149 |
| 6,863,249 B1 | 3/2005 | Alvord | |
| 7,021,644 B1 | 4/2006 | Master | |
| 7,210,255 B2 | 5/2007 | Blackburn | |
| D638,296 S * | 5/2011 | Levine ..................... | D9/434 |
| 8,973,875 B2 * | 3/2015 | Cuadrado ............ | A63B 69/201 248/214 |
| 9,102,276 B1 * | 8/2015 | Virgin ..................... | B60R 7/043 |
| 9,623,806 B2 * | 4/2017 | Rodriguez ............. | B60R 7/043 |
| 2002/0088832 A1 | 7/2002 | Anton | |
| 2003/0129038 A1 | 7/2003 | Addy | |
| 2006/0191173 A1 | 8/2006 | Levine | |
| 2008/0156834 A1 * | 7/2008 | Tipaldo .................... | A45F 3/14 224/258 |
| 2011/0049839 A1 | 3/2011 | Byrd | |
| 2011/0058914 A1 | 3/2011 | Ogden | |
| 2013/0062384 A1 | 3/2013 | Phillips | |

* cited by examiner

PORTABLE CARRIER FOR HOLDING BAGS OR HOLDING DISPLAYS ON VEHICLES

CROSS-REFERENCE TO RELATED APPLICATIONS

This application is a continuation-in-part of and claims priority to a parent application Ser. No. 13/444,844, Publication Number US20130270316 A1, and the contents of the parent application are hereby incorporated.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

STATEMENT REGARDING PRIOR DISCLOSURES

Not Applicable

SEQUENCE LISTING

Not Applicable

BACKGROUND OF THE INVENTION

Field of the Invention

The present invention relates to the transportation of containers, and more particularly the methods and apparatuses for mounting and transporting trash for disposal by a vehicle.

Description of the Related Art

In many residential communities and business locations, trash is required to be disposed off in a garbage collection facility or a similar designated area from where it is picked up by a garbage disposal service. Typically, trash is collected in a can or a similar receptacle lined with a disposable trash bag. Alternatively, trash may also be collected in plastic carry bags or similar containers. Most trash bags are equipped with drawstring loops, handles or tie-extensions, among similar provisions, which are tied with each other into a knot to shut the bag and which also serve as grips to hold or hang the bag. If there is no specific provision made to tie a bag, the opposite edges of the bag can be pulled together and tied into a knot. The knot itself is generally tied by forming a looped grip which has one or more loops to hold the bag or a knotted grip which has just a knot and no loops to hold the bag. After a trash bag is full and tied shut, it is removed and transported, along with other trash bags if any, to the garbage disposal venue. While the general methods of transporting trash bags, including travelling by foot or a vehicle, are relatively simple for individuals residing nearby the garbage disposal venue, they can be challenging for the ones residing farther away. The quantity, type, size, weight, shape and grips of trash bags can make the task more challenging, particularly when travelling by foot. Moreover, when trash bags are transported by placing them on a vehicle, for instance on the trunk or rooftop of a car, extra care needs to be taken to avoid dropping them to the ground. When they are placed inside a vehicle, for instance in the trunk or inside of a car itself, any leak can stain the interiors in addition to the possibility of leaving behind an unpleasant odor.

Though there are a few devices which were developed to assist in transporting trash bags to a garbage disposal venue for disposal, the inadequacy of appropriate apparatuses and methods to do so conveniently and efficiently makes this commonest of chores a challenge even today.

U.S. Pat. No. 6,863,249 describes a device that hauls garbage bags. However, the fact that using the device necessitates its placement over a door frame or an open window presents several drawbacks.

1. It makes it very inconvenient to enter or exit the vehicle through the door on which the garbage bag is hung.
2. The device cannot be used for trash bags which do not have looped grips to hang the bags.
3. The trash bag can limit outside visibility for the driver, and passengers, which could compromise safety.
4. In warm, cold or rainy weather conditions, an open window with garbage bags hung on it can expose the passengers inside to external precipitation, unfavorable temperatures and any unpleasant odor emanating from the trash.
5. Hanging heavy trash bags over the window glass can damage the glass-roller assembly by putting undue load on it.
6. Configuring the device in place for, and removing it after, each use not only demands extra effort but also increases the likelihood of misplacing the device as there is no specific provision made for storing it in a particular place.
7. From an appearance standpoint, driving a vehicle with trash bags hanging over the windows on either side can be unsightly and aesthetically undesirable.

US2001/0049839 describes a cart which is specifically meant to hold garbage cans. Because the cart is towed behind a vehicle, the driver may require knowledge and skills above those required to drive the vehicle otherwise. And the requirement to keep the trunk lid closed when towing the cart may be undesirable when, for instance, an oversized container is also to be transported in the trunk. Furthermore, the device cannot be easily stored inside a vehicle.

BRIEF SUMMARY OF THE INVENTION

It is, therefore, a first object of the present invention to provide methods and apparatuses that hold trash containers preferably on the exterior of a vehicle for conveniently transporting trash from a residence, business or office to a trash collection venue for disposal.

It is a second object of the present invention to provide apparatuses comprising a hook member that is capable of holding virtually any type of trash bag. A hook member preferably includes a horizontal rod with strong hook-shaped or tooth-shaped or claw-shaped projections which are sufficiently angled to keep the mounted trash bags from falling off. The projections are not limited to these shapes; they can be of other shapes that would be considered an equivalent structure. Each projection serves as a hook on which loop grips of a trash bag can be mounted. The grooves between the projections are spaced sufficiently to serve as traps for holding trash bags with a knotted grip that has no loops. Though not necessary, the rod may be equipped with elastic straps that can be attached to both ends. The straps serve to hold trash containers that cannot be mounted on or between the projections.

It is a third object of the present invention to provide portable apparatuses that are readily attachable to, and removable from, a vehicle.

It is a fourth object of the present invention to provide apparatuses that are capable of being adapted to virtually any vehicle.

It is a fifth object of the present invention to provide apparatuses with an adaptable base that can receive different attachment members for same or different purposes. One example of an attachment member is a hook member used for holding trash containers, banners, advertisements, flags, messages, symbols or signs among other displays. Another example is a display member that is used exclusively for holding banners, advertisements, flags, messages, symbols or signs among other displays. The types of displays listed for the display member are just a few examples and are not limited to these types.

The following presents a simplified summary of the preferred embodiments of the invention in order to provide a basic understanding of the example aspects of the invention. The summary is not an extensive overview of the invention. Moreover, the summary is not intended to identify critical elements of the invention nor delineate the scope of the invention.

A first embodiment of the invention is an apparatus that is fixed in the license plate area of a vehicle. The apparatus includes an adjustable size rack and one or more high strength shoulder bolts which are rigid and inflexible. The rack comprises a detachable hook member consisting of one or more hook-shaped, tooth-shaped or claw-shaped projections near the top and a base member consisting of a receiver segment and an engagement segment near the bottom. The receiver segment consists of one or more telescopic rods, the plurality of which are connected by at least one horizontal rod, and receives the hook member in an interlocking manner from the upper section. One way of locking the relative position of a hook member on a receiver segment is by using quick-releasable spring-loaded detent pins and providing one or more adjustment notches on the hook member and receiver segment for the quick-release pins to firmly lock into. The engagement segment consists of one or more keyholes which are aligned with through holes of the license plate of a vehicle and extends from the lower section of the receiver segment. The shoulder of a shoulder bolt is preferably cylindrical and comprises an enlarged diameter section and a reduced diameter. The diameter of the shoulder is greater than that of the threaded section of a shoulder bolt and also that of the through holes of the license plate. The shoulder not only holds the license plate firmly on to a vehicle but also supports the apparatus on the vehicle. The apparatus is attached to a vehicle by substituting the manufacturer supplied bolts of the license plate with the shoulder bolts and fixing the license plate by inserting these bolts through the through holes in the license plate and screwing them into the threaded mounting holes in the vehicle until the license plate is firmly held in place. However, one or more vehicle manufacturer supplied bolts that secure the license plate to the vehicle, or one or more high strength bolts which are rigid and inflexible, can replace one or more shoulder bolts to secure the license plate to the vehicle such that at least a portion of said one or more vehicle manufacturer supplied bolts or high strength bolts is visible in addition to an already visible bolt head after the license plate has been fixed using one or more lock nuts. The bolt head and the portion between the lock nut and bolt head of a bolt serve as a shoulder. The rack is then removably mounted on the shoulders such that the shoulders are received by the engagement segment through its keyholes and placed firmly in position. The apparatus is operated by mounting one or more trash bags by the loop grip or knot grip, as applicable, on or between one or more hook-shaped, tooth-shaped or claw-shaped projections on the hook member. The height of the rack may be adjusted as desired to allow for clearance between the ground and mounted trash bags. The vehicle is driven to the garbage collection venue where the trash bags are removed and disposed off. After its use, the rack can be either stored inside the vehicle, preferably in the trunk, or left in its position for future use.

A second embodiment of the invention is an apparatus that is also fixed in the license plate area of a vehicle. The apparatus includes an adapter comprising a high strength license plate frame, an adjustable size rack and one or more high strength bolts which are rigid and inflexible. The rack comprises a detachable hook member consisting of one or more hook-shaped, tooth-shaped or claw-shaped projections near the top and a base member consisting of a receiver segment and an engagement segment near the bottom. The receiver segment consists of one or more telescopic rods, the plurality of which are connected by at least one horizontal rod, and receives the hook member in an interlocking manner from the upper section. One way of locking the relative position of a hook member on a receiver segment is by using quick-releasable spring-loaded detent pins and providing one or more adjustment notches on the hook member and receiver segment for the quick-release pins to firmly lock into. The engagement segment consists of one or more keyholes and extends from the lower section of the receiver segment. The adapter has at least one but preferably four through holes, two each on the top and bottom sides of the frame, which are preferably aligned with those of the license plate of a vehicle. The adapter also has at least one but preferably four shoulders, two each on the left and right sides of the frame, which are long and strong enough to allow for the rack to be snugly mounted on them. The apparatus is removably attached to a vehicle using the same threaded mounting holes in the vehicle as used by the license plate by unbolting the license plate, optionally substituting the manufacturer supplied bolts with the high strength bolts, aligning the adapter frame preferably over the license plate and firmly bolting them both to the vehicle. Using high strength bolts is preferred but not necessary if the vehicle manufacturer supplied bolts are adequately long and strong. The rack is then removably mounted on the shoulders of the adapter such that the shoulders are received by the engagement segment through its keyholes and positioned firmly. The apparatus is operated by mounting one or more trash bags by the loop grip or knot grip, as applicable, on or between one or more hook-shaped, tooth-shaped or claw-shaped projections on the hook member. The height of the rack may be adjusted as desired to allow for clearance between the ground and mounted trash bags. The vehicle is driven to the garbage collection venue where the trash bags are removed and disposed off. After its use, the rack can be either stored inside the vehicle, preferably in the trunk, or left in its position for future use.

A third embodiment of the invention is an apparatus that includes an adjustable size rack, a strong adjustable length restraining bar long enough to firmly anchor on to any interior wall of the trunk, at least one but preferably two adjustable length waterproof straps which are thin enough to snugly fit between the trunk door and its frame. The rack comprises a detachable hook member consisting of one or more hook-shaped, tooth-shaped or claw-shaped projections near the top and a base member consisting of a receiver segment and an engagement segment near the bottom. The receiver segment consists of one or more telescopic rods, the plurality of which are connected by at least one horizontal rod, and receives the hook member in an interlocking manner from the upper section. One way of locking the relative position of a hook member on a receiver segment is by using quick-releasable spring-loaded detent pins and providing one or more adjustment notches on the hook member and receiver segment for the quick-release pins to firmly lock into. The engagement segment consists of one or more strap eyelets and extends from the center of the receiver segment. The adjustable length restraining bar is of the telescopic type comprising two or more concentric elements with one or more concentric elements having a diameter greater than that of the element it contains. An example of a restraining bar is a spring-loaded tension rod comprising an inner tube that slides within an outer tube. When the inner tube is pushed inside the outer tube, it compresses a spring creating tension that secures the rod in place by pushing the two tubes out against the surfaces it is engaged to. Each adjustable strap has a distal end which is attached to the engagement segment of the rack by looping through an eyelet and a proximal end which is attached to the restraining bar at any suitable position by looping around the bar. The apparatus is removably attached to the trunk of a vehicle in such way that the restraining bar is placed inside the trunk. Though not necessary, the bar is preferably secured by adjusting its length such that the opposite ends of the bar are engaged to any corresponding, preferably side opposite, walls of the inner trunk adequately enough to hold the bar in position. The straps extending from the restraining bar are positioned such that the straps sit snugly between the trunk door and door frame when the trunk is closed. However, it is not necessary to close the trunk door for the apparatus to function. The rack, attached to the distal ends of the straps, is suspended on the exterior of the vehicle such that it is supported either by the bumper or the body frame as applicable to the vehicle. The length of the straps is adjusted such that the suspended rack does not interfere with the opening and closing of the trunk door. Optionally, to minimize any undesired movements of the apparatus, one or more additional detachable straps can be attached, vertically and laterally, to the rack and bumper frame. The apparatus is operated by mounting one or more trash bags by the loop grip or knot grip, as applicable, on or between one or more hook-shaped, tooth-shaped or claw-shaped projections on the hook member. The height of the rack may be adjusted as desired to allow for clearance between the ground and mounted trash bags. The vehicle is driven to the garbage collection venue where the trash bags are removed and disposed off. After its use, the rack can be either stored inside the vehicle, preferably in the trunk, or left in its position for future use.

A fourth embodiment of the invention is an apparatus that mounts preferably over a spare wheel that is installed exterior to a vehicle. The apparatus includes an adjustable size rack which comprises a detachable hook member consisting of one or more hook-shaped, tooth-shaped or claw-shaped projections near the top and a base member consisting of a receiver segment and an engagement segment near the bottom. The receiver segment consists of one or more telescopic rods, the plurality of which are connected by at least one horizontal rod, and receives the hook member in an interlocking manner from the upper section. One way of locking the relative position of a hook member on a receiver segment is by using quick-releasable spring-loaded detent pins and providing one or more adjustment notches on the hook member and receiver segment for the quick-release pins to firmly lock into. The engagement segment consists of one or more strong, flexible and resilient arms extending from the center of the receiver segment. Each arm comprises a sufficiently long horizontal portion and vertical portion. The vertical portion comprises two links which are attached together in a "V" shaped configuration which helps in easing the arm on to the wheel when mounting the apparatus. The apparatus is removably mounted on the external spare wheel of a vehicle such that the arms sit on the circumference of the wheel. The apparatus is operated by mounting one or more trash bags by the loop grip or knot grip, as applicable, on or between one or more hook-shaped, tooth-shaped or claw-shaped projections on the hook member. The height of the rack may be adjusted as desired to allow for clearance between the ground and mounted trash bags. The vehicle is driven to the garbage collection venue where the trash bags are removed and disposed off. After its use, the rack can be either stored inside the vehicle, preferably in the trunk, or left in its position for future use.

A fifth embodiment of the invention is an apparatus that includes at least one adjustable length waterproof strap with a distal end and a proximal end, an engagement loop attached to the proximal end of the strap and at least one hook member attached to the distal end of the strap. The hook member consists of one or more hook-shaped, tooth-shaped or claw-shaped projections or a loop-like formation and is optionally provided with a vacuum suction cup that can be secured to a surface. The apparatus may further be provided with an adjustable loop-lock which is adjustable along the length of the strap and/or the engagement loop. The apparatus is removably attached preferably to a door of a vehicle by first rolling the window glass down, opening the door and then winding the strap around the top portion of the window frame of the door such that the hook member on the distal end is drawn through the engagement loop on the proximal end into a cow-hitch knot (structure) and pulled until a secure and tight knot is formed leaving the hook member on the outside of the vehicle. The loop-lock allows control over the size, shape and, consequently, the tightness, of the cow-hitch knot around the door frame (fixing means) by stopping or locking a portion of the engagement loop into the loop-lock which can be adjusted to a desired position. One of the main benefits of a loop-lock is that it allows the cow-hitch knot to be configured in such a way that it is not too tight around the door frame, when installed around it, to cut through the rubber beading or indent the rubber beading more than required. Another benefit is that the shape and size of the cow-hitch knot is not altered by the weight of the trash bags when they are hung on the hook member. While a loop-lock can control the shape, size and the resulting tightness of the cow-hitch knot around the door frame, the load applied by the apparatus (with trash bags mounted) on the door frame could still shift some of the weight on to the rubber beading which could result in either cutting through the rubber beading or indenting the beading more than required. To overcome this problem, a loop-lock may further comprise a hook that anchors on to the fixing means such as the door frame. In this case, the load is shifted onto the door frame and the cow-hitch knot adjusted to desired shape, size and tightness keeps the apparatus in position around the door frame. The vacuum suction cup attached to the hook member may be secured, anywhere within the radius extended by the strap of the apparatus from the proximal end, to a smooth surface, such as the window glass of the vehicle, to minimize any undesired vertical or lateral movements when the vehicle is in motion. The strap is thin enough to snugly fit between a door frame and a main body frame of a vehicle so as to not interfere with the opening and closing operations of a door. The strap is also thin enough to snugly fit between a window glass and a window frame of a vehicle door so as to not interfere with the opening and closing operations of a window glass. It is not required that the door or the window is closed for the apparatus to function. However, it is preferred that the door is closed so that a portion of said cow-hitch knot is sandwiched, trapped and immobilized between the door frame and the main body frame and/or also the door frame and the window glass of the vehicle. Further, the strap is thin enough to maintain the weatherproofing seal between the door frame and the main body and between the window glass and the window frame. The engagement loop is big enough to allow the hook member to pass through it. The apparatus is operated by mounting one or more trash bags by the loop grip or knot grip, as applicable, on or between one or more hook-shaped, tooth-shaped or claw-shaped projections or a loop-like formation of the hook member. The length of the strap may be adjusted as desired to allow for clearance between the ground and mounted trash bags. The vehicle is driven to the garbage collection venue where the trash bags are removed and disposed off. After its use, the apparatus can be either stored inside the vehicle or left in its position for future use. Alternatively, the apparatus can also be removably attached to a grab handle located on the interior of a vehicle by winding the strap around grab handle such that the hook member on the distal end is drawn through the engagement loop on the proximal into a cow-hitch knot until they form a secure and tight knot leaving the strap and the hook member attached to it hanging inside the vehicle. The strap is long enough to extend outside the vehicle when required. Before the apparatus is used, the door is opened to extend the strap out of the vehicle and then closed such that the hook member is on the outside of the vehicle and a portion of the strap is positioned between the door frame and the main body of the vehicle. Other options of securing the apparatus to, in addition to a door frame and a grab handle, include but are not limited to: door hinges, door handles, trunk hinges, trunk struts, roof rack, bumper, rear view mirrors, spoilers, fuel tank lid, license plate bolts, spare tires, wipers, body frame between adjacent doors of a vehicle, etceteras. The apparatus can also be used on other modes of transport including bicycles and motor bikes among others.

It is a sixth object of the present invention to provide a method of conveniently transporting trash containers to a garbage disposal venue, where the method comprises the following steps:
1. providing a vehicle to transport the trash containers.
2. providing an apparatus appropriate to said vehicle for transporting the trash containers.
    a. said apparatus including one or more high strength shoulder bolts
        i. using said shoulder bolts to fix the license plate on the vehicle.
    b. said apparatus including an adjustable size rack comprising a detachable hook member with one or more hook-shaped, tooth-shaped or claw-shaped projections and a base member consisting of a receiver segment and an engagement segment.
        i. said receiver segment consisting of one or more telescopic rods and receiving the hook member in an interlocking manner from the upper section.
        ii. said engagement segment consisting of one or more keyholes and extending from the lower section of the receiver segment
        iii. said rack mounted on the shoulders of shoulder bolts through the keyholes of the engagement segment
3. taking one or more trash containers from home, business or office to the vehicle
4. temporarily mounting said trash containers on or between the hook-shaped, tooth-shaped or claw-shaped projections of the hook member and adjusting the height of the hook member of the rack as needed
5. driving the vehicle to a garbage disposal venue
6. removing the trash containers from the hook member
7. optionally removing and storing the rack in the trunk of the vehicle The recommended order of performing said steps is the order as written in the claim, but the claim is not limited to the order in which the steps are mentioned. The steps can be performed in a different order.

It is a seventh object of the present invention to provide a method of conveniently transporting trash containers to a garbage disposal venue, where the method comprises the following steps:
1. providing a vehicle to transport the trash containers.
2. providing an apparatus appropriate to said vehicle for transporting the trash containers.
    a. said apparatus including an adapter comprising high-strength license plate frame with one or more through holes and one or more shoulders
    b. said apparatus including one or more high strength bolts
    c. said apparatus including an adjustable size rack comprising a detachable hook member with one or more hook-shaped, tooth-shaped or claw-shaped projections and a base member consisting of a receiver segment and an engagement segment.
        i. said receiver segment consisting of one or more telescopic rods and receiving the hook member in an interlocking manner from the upper section.
        ii. said engagement segment consisting of one or more keyholes and extending from the lower section of the receiver segment
    d. said apparatus installed to the license plate area of the vehicle by aligning the adapter frame over the license plate, bolting them both to the vehicle using said high strength bolts and mounting the rack on the shoulders of the adapter through the keyholes of the engagement segment
3. taking one or more trash containers from home, business or office to the vehicle
4. temporarily mounting said trash containers on or between the hook-shaped, tooth-shaped or claw-shaped projections of the hook member and adjusting the height of the hook member of the rack as needed
5. driving the vehicle to a garbage disposal venue
6. removing the trash containers from the hook member
7. optionally removing and storing the rack in the trunk of the vehicle The recommended order of performing said steps is the order as written in the claim, but the claim is not limited to the order in which the steps are mentioned. The steps can be performed in a different order.

It is an eighth object of the present invention to provide a method of conveniently transporting trash containers to a garbage disposal venue, where the method comprises the following steps:
1. providing a vehicle to transport the trash containers.
2. providing an apparatus appropriate to said vehicle for transporting the trash containers.
   a. said apparatus including a strong adjustable-length restraining bar
   b. said apparatus including one or more adjustable-length waterproof straps
   c. said apparatus including an adjustable size rack comprising a detachable hook member with one or more hook-shaped, tooth-shaped or claw-shaped projections and a base member consisting of a receiver segment and an engagement segment.
      i. said receiver segment consisting of one or more telescopic rods and receiving the hook member in an interlocking manner from the upper section.
      ii. said engagement segment consisting of one or more strap eyelets and extending from the center of the receiver segment
   d. said apparatus installed to the vehicle by positioning the restraining bar in the trunk and suspending the rack by the straps on the outside of the trunk
3. taking one or more trash containers from home, business or office to the vehicle
4. temporarily mounting said trash containers on or between the hook-shaped, tooth-shaped or claw-shaped projections of the hook member and adjusting the height of the hook member of the rack as needed
5. driving the vehicle to a garbage disposal venue
6. removing the trash containers from the hook member
7. optionally storing the rack in the trunk of the vehicle The recommended order of performing said steps is the order as written in the claim, but the claim is not limited to the order in which the steps are mentioned. The steps can be performed in a different order.

It is a ninth object of the present invention to provide a method of conveniently transporting trash containers to a garbage disposal venue, where the method comprises the following steps:
1. providing a vehicle to transport the trash containers.
2. providing an apparatus appropriate to said vehicle for transporting the trash containers.
   a. said apparatus including an adjustable size rack comprising a detachable hook member with one or more hook-shaped, tooth-shaped or claw-shaped projections and a base member consisting of a receiver segment and an engagement segment.
      i. said receiver segment consisting of one or more telescopic rods and receiving the hook member in an interlocking manner from the upper section.
      ii. said engagement segment consisting of one or more resilient arms extending from the center of the receiver segment
   b. said apparatus mounted on the external spare wheel of the vehicle
3. taking one or more trash containers from home, business or office to the vehicle
4. temporarily mounting said trash containers on or between the hook-shaped, tooth-shaped or claw-shaped projections of the hook member and adjusting the height of the hook member of the rack as needed
5. driving the vehicle to a garbage disposal venue
6. removing the trash containers from the hook member
7. optionally storing the rack in the trunk of the vehicle The recommended order of performing said steps is the order as written in the claim, but the claim is not limited to the order in which the steps are mentioned. The steps can be performed in a different order.

The foregoing and other objects, characteristics and benefits of the present invention will become more apparent from the following detailed description of the invention when considered in conjunction with the accompanying drawings of the preferred embodiments.

BRIEF DESCRIPTION OF THE SEVERAL VIEWS OF THE DRAWING(S)

DETAILED DESCRIPTION OF THE INVENTION

Although the following disclosure is detailed and exact to enable those skilled in the art to practice the invention, the physical embodiments disclosed herein merely exemplify the invention. The invention could take the form of other specific structures. While the essence of preferred embodiments has been described, the details may be changed without departing from the invention which is defined by the claims.

Figure 14:
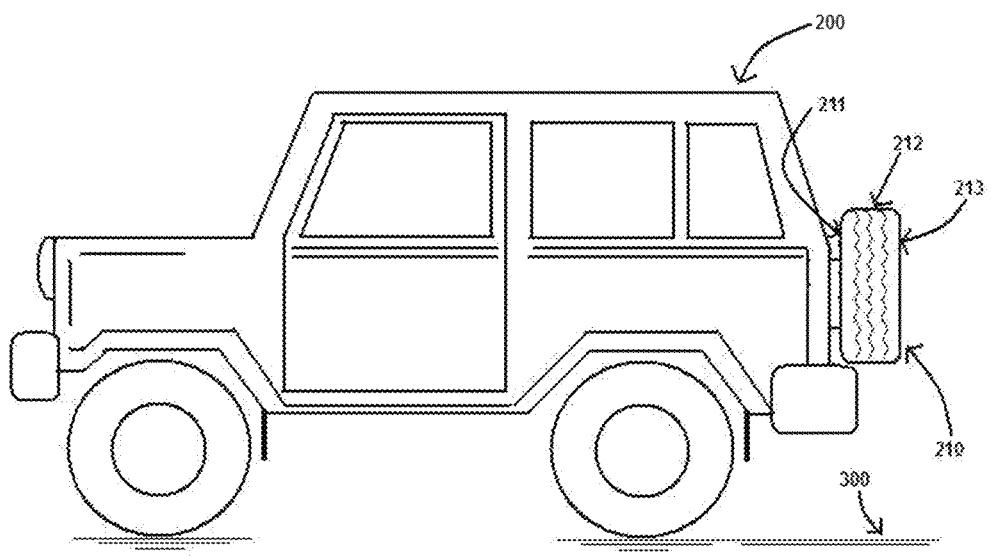
FIG. 14 is a side view of a vehicle with an external spare wheel on the rear.
Figure 15:
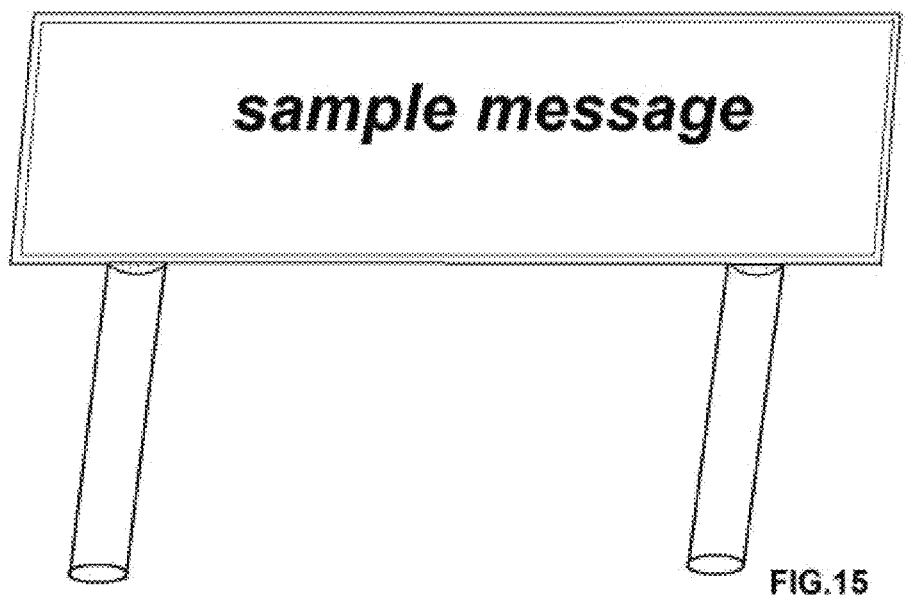
FIG. 15 is a view of an example of a detachable display member that can be fixed to the base member of the apparatuses.
Figure 16:
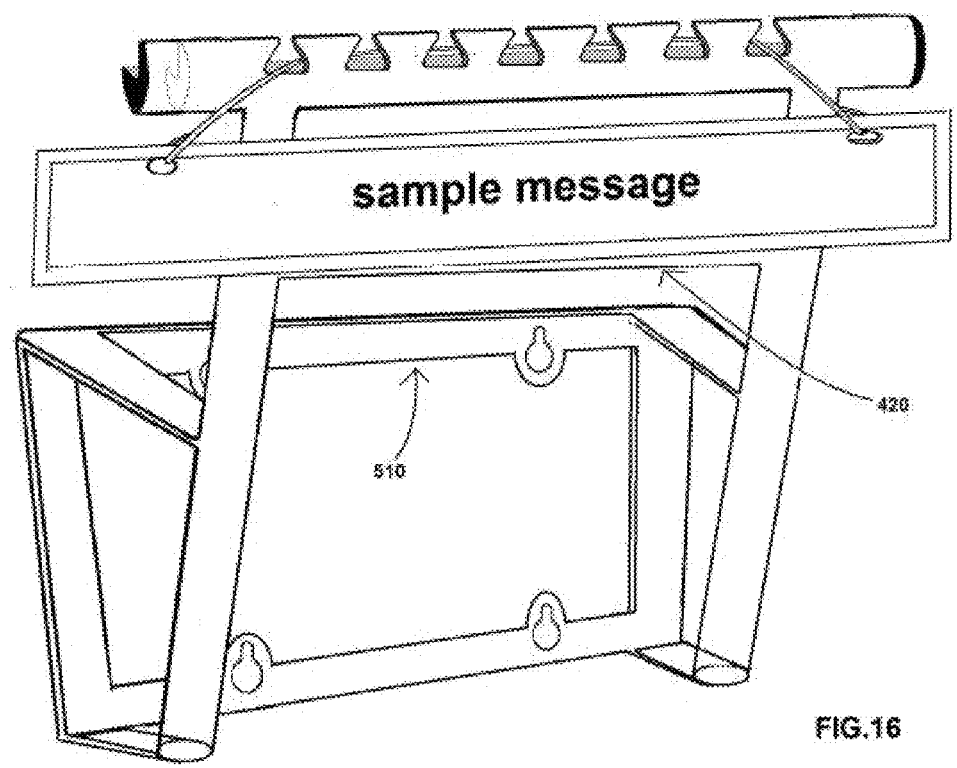
FIG. 16 is a view showing an example of a display hung over the hook-shaped or tooth-shaped or claw-shaped projections of a first embodiment by a string attached to the display.
Figure 17:
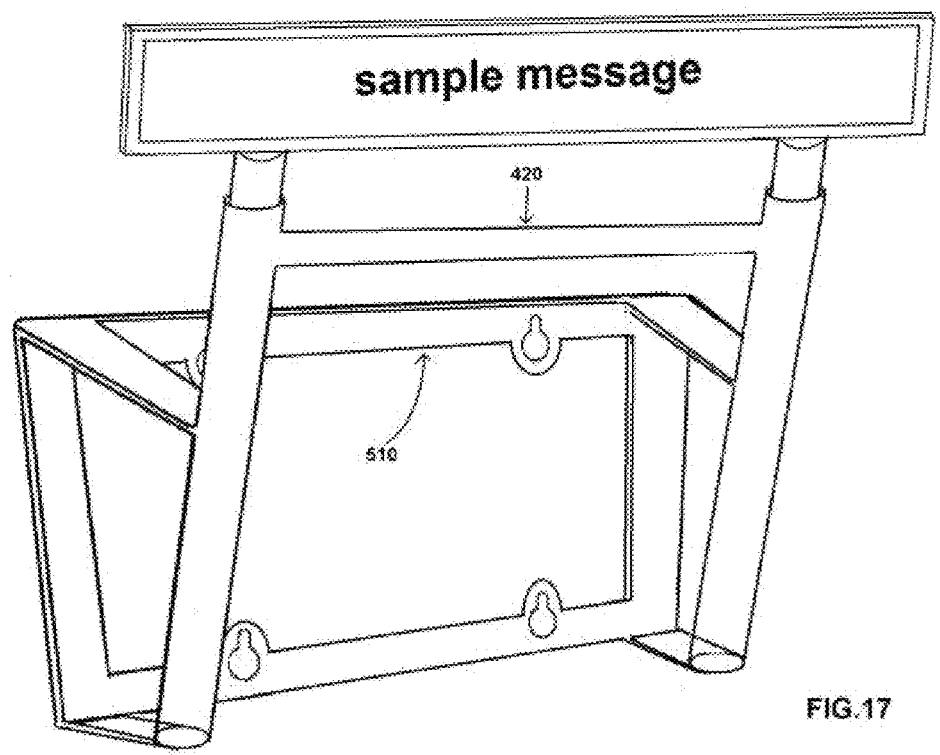
FIG. 17 is a view of the display member of FIG. 15 attached to the receiver segment of a rack of the first embodiment.
Figure 18:
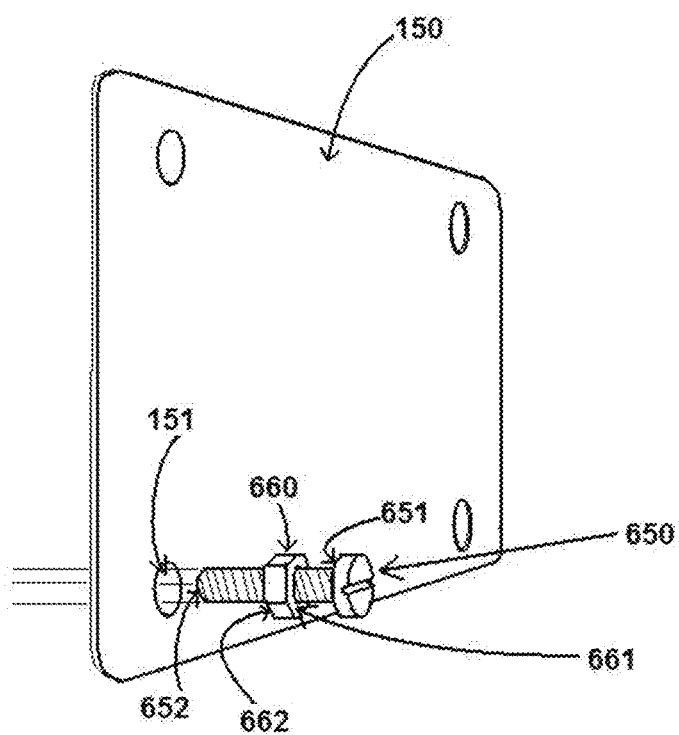
FIG. 18 is a side view showing the manner in which a lock nut is configured on a vehicle manufacturer supplied bolt or a high strength bolt before inserting the bolt through a through hole of a license plate.

The preferred embodiments of apparatuses of the current invention are illustrated in FIG. 1 through FIG. 18. The apparatuses are generally used for mounting trash bags 900 on hook-shaped or tooth-shaped or claw-shaped projections 411 in FIG. 11 or the gaps 412 between the projections 411 in FIG. 12 of a detachable hook member 400 of a rack in FIG. 1, FIG. 5, FIG. 6 or FIG. 7 and transporting them by a vehicle 100 in FIG. 13 or 200 in FIG. 14 to a garbage disposal venue for disposal. In addition to holding trash bags, the hook member is capable of holding banners, advertisements, flags, messages, symbols or signs among other displays. For example, as shown in FIG. 16, a string is tied through one or more holes of the display which is then hung by placing the string over the hook-shaped or tooth-shaped or claw-shaped projections 411. Another variation of this embodiment is configured exclusively for holding displays including but not limited to banners, advertisements, flags, messages, symbols or signs by using a display member instead of a hook member. In this embodiment, the hook-shaped or tooth-shaped or claw-shaped projections don't exist as the purpose is for holding displays. FIG. 15 shows an example of a display member for displaying a message. FIG. 17 shows the display member of FIG. 15 removably attached to the receiver segment 420 of the rack such that one or more legs of the display member are telescopically received by one or more vertical rods on the receiver segment 420. Although the drawings show a hollow vertical rod with a leg inside the hollow vertical rod, it will be apparent to one of ordinary skill that the leg itself can be made hollow instead, with the vertical rod being inserted inside the leg. The types of displays listed for the display member are just a few examples and are not limited to these types.

Figure 8:
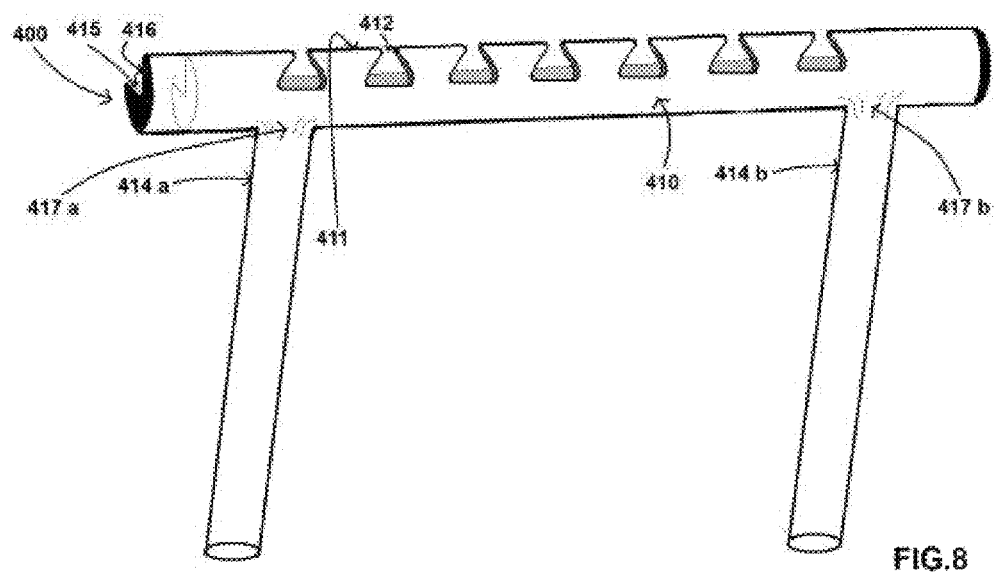
FIG. 8 is a view of a detachable hook member which can be fixed to the base member of the apparatuses.
Figure 9:
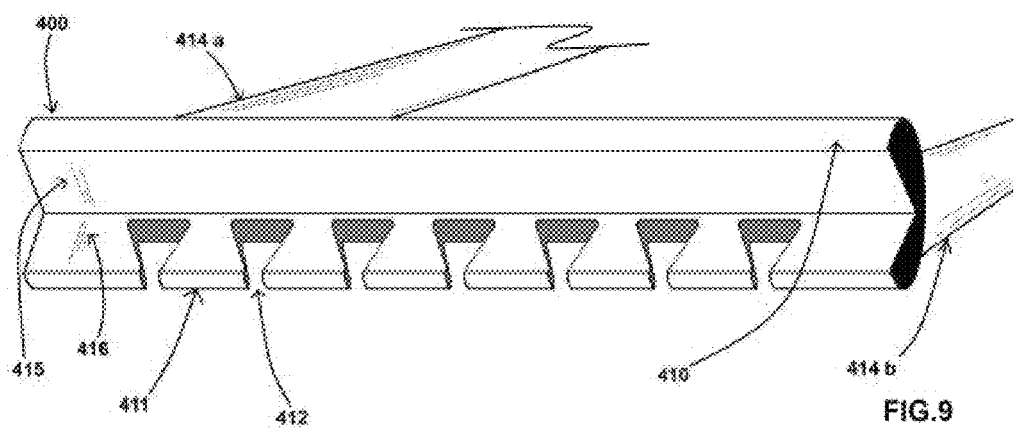
FIG. 9 is a close-up of the top view of a detachable hook member.
Figure 10:
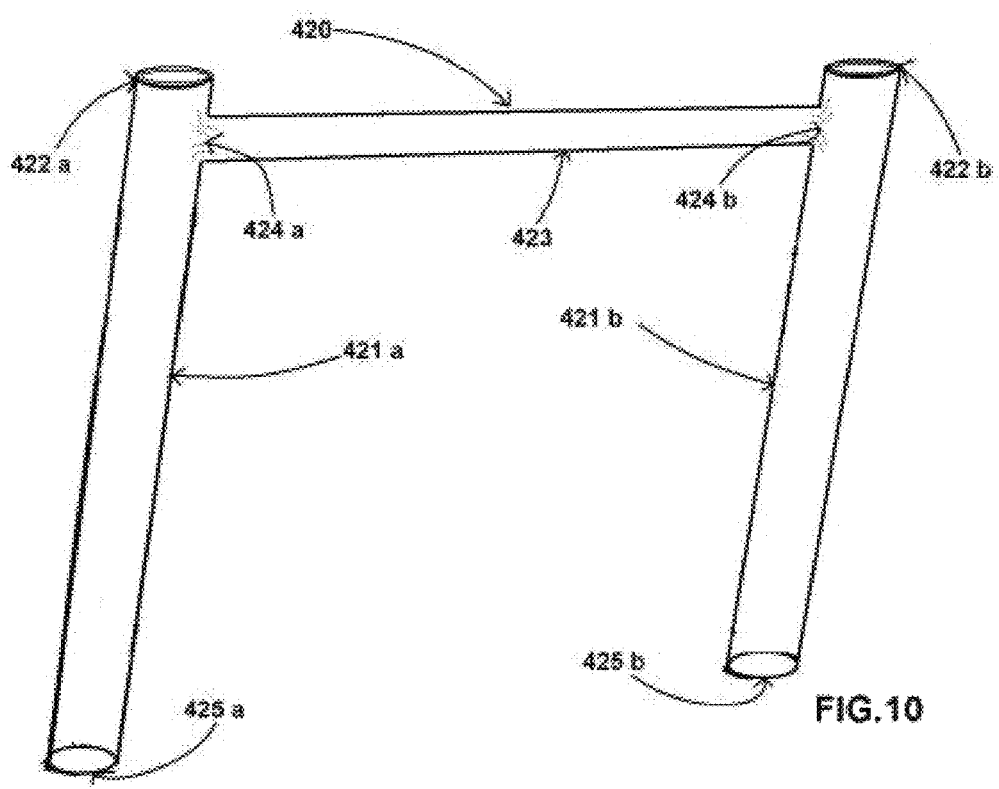
FIG. 10 shows the receiver segment of a base member

As shown in FIG. 8, a detachable hook member 400 is generally a horizontal rod 410 with a sufficiently wide and deep "L"-shaped groove formed by surfaces 415 and 416. One example of a sufficient groove is when the surfaces 415 and 416 are formed along a radius of the cross section of the rod, and the angle between the surfaces is about 90 degrees. The surface 416 contains tooth-shaped or claw-shaped or hook-shaped projections 411 which are strong enough to support the weight of mounted trash bags. The tooth-shaped or claw-shaped or hook-shaped projections are examples of structures that are equivalent to the "means for" invocation in the claims in accordance with the provisions of 35 U.S.C 112 $6^{th}$ paragraph. Note that these three structures are examples only, all equivalents of these structures are within the scope of the 112 $6^{th}$ paragraph invocation. The projections 411 have evenly spaced gaps 412 which are wide enough to accommodate the thickness of not only the drawstring loops 910a and 910b of a trash bag 900 in FIG. 11 but also the neck below the knot 912 made by extensions 912a and 912b of a trash bag 900 in FIG. 12. Two legs 414a and 414b are attached to rod 410 at 417a and 417b respectively and are telescopically received, in an interlocking manner, by a receiver segment 420 in FIG. 10 through openings 422a and 422b of vertical rods 421a and 421b respectively. Although the drawings show a hollow vertical rod with a leg inside the hollow vertical rod, it will be apparent to one of ordinary skill that the leg itself can be made hollow instead, with the vertical rod being inserted inside the leg. One way of locking the relative position of a hook member or display member on a receiver segment is by using quick-releasable spring-loaded detent pins and providing one or more adjustment notches on the hook member and receiver segment for the quick-release pins to firmly lock into. The vertical rods 421a and 421b of the receiver segment are attached by a horizontal rod 423 at points 424a and 424b respectively.

Figure 1:
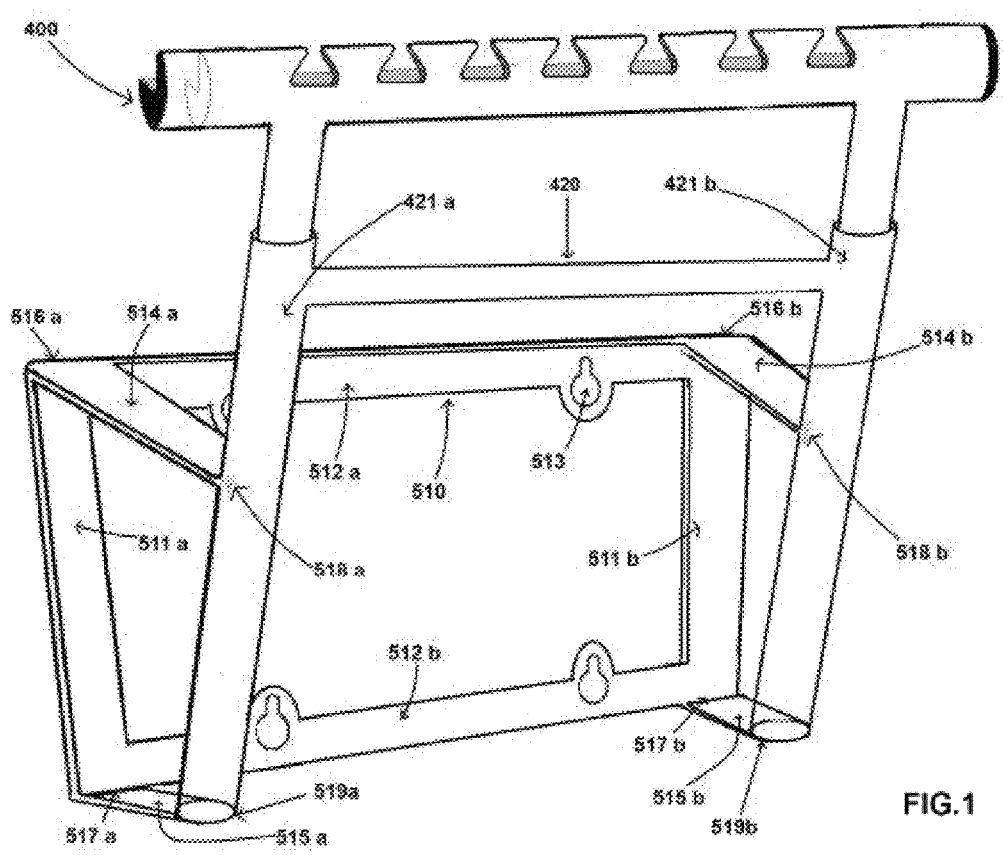
FIG. 1 is a side-angle view of a rack of a first embodiment with the hook member attached to the base member.
Figure 2:
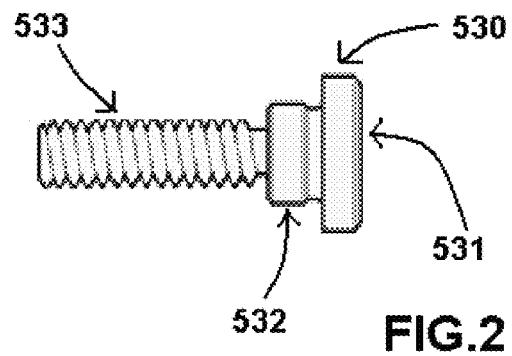
FIG. 2 is a side view of a shoulder bolt of a first embodiment.
Figure 3:
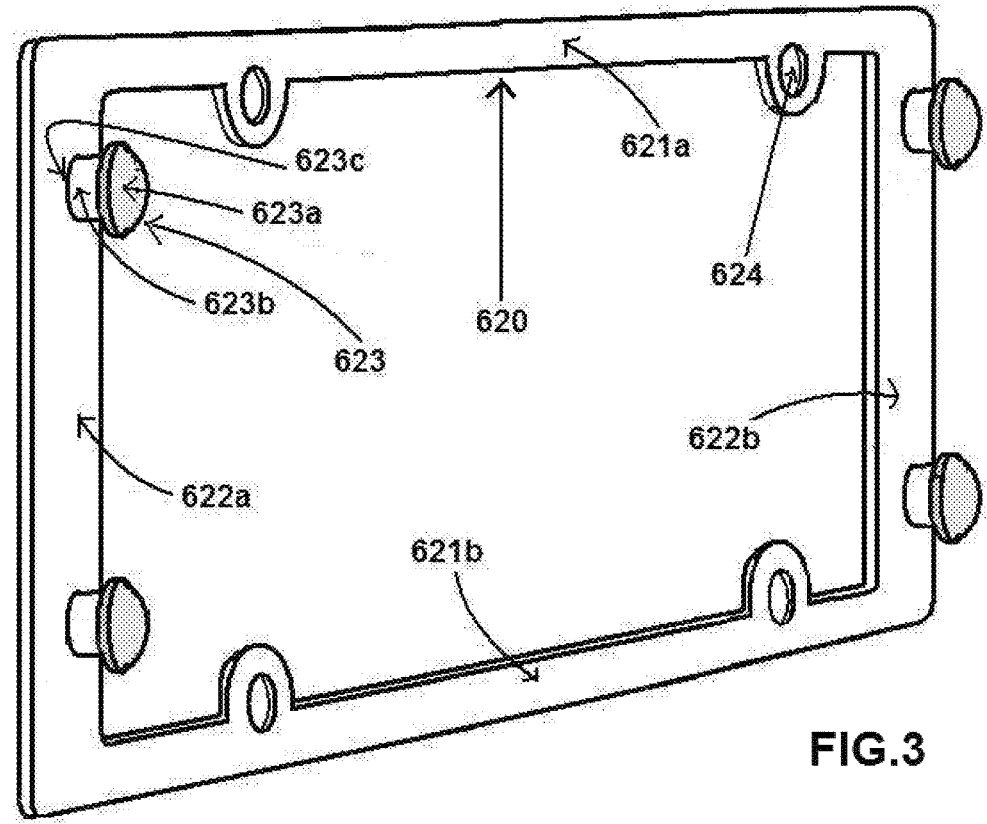
FIG. 3 is a side-angle view of the adapter comprising four shoulders and four through holes.
Figure 4:
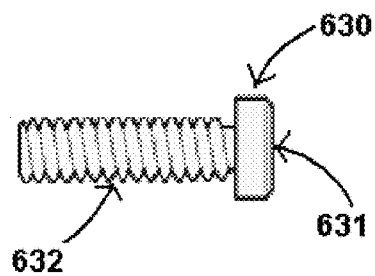
FIG. 4 is a side view of a high strength bolt of a second embodiment.
Figure 11:
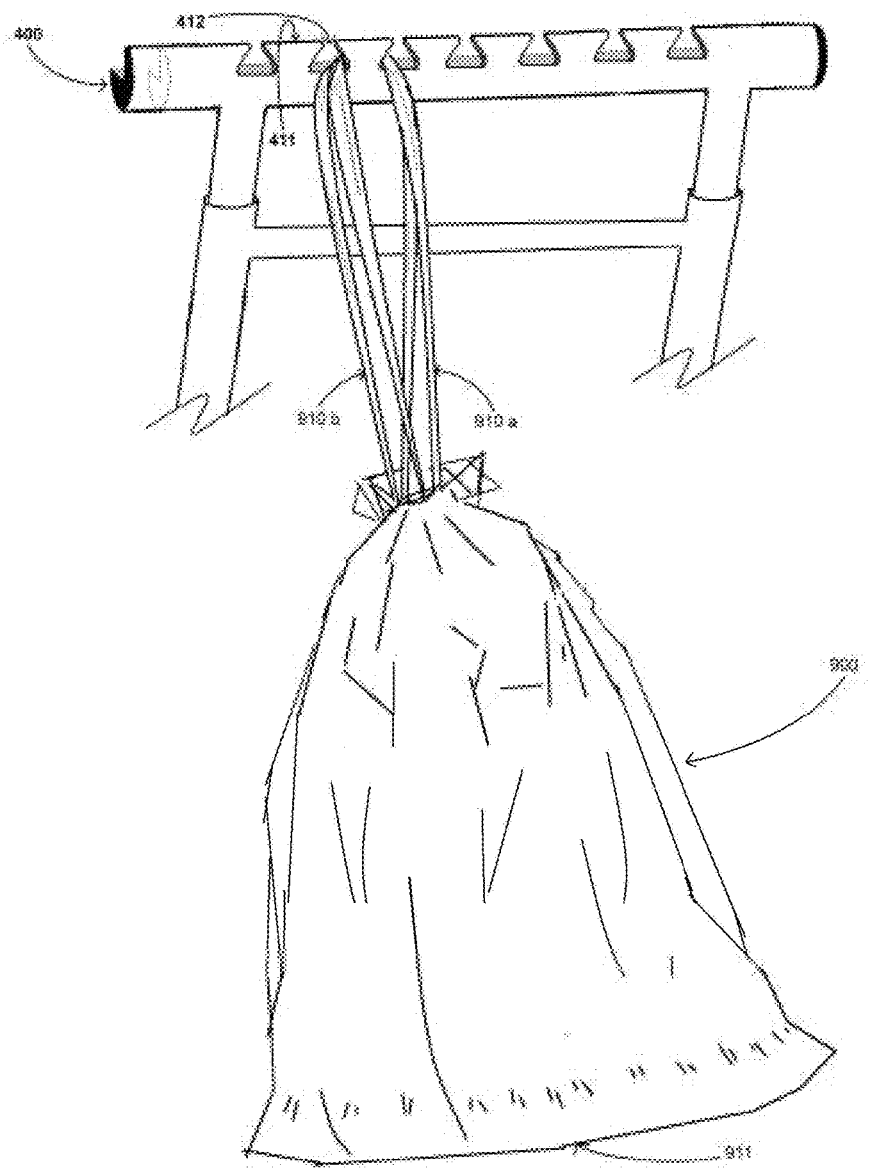
FIG. 11 is a sectional view showing a trash bag mounted by a loop grip on a projection of a hook member.
Figure 12:
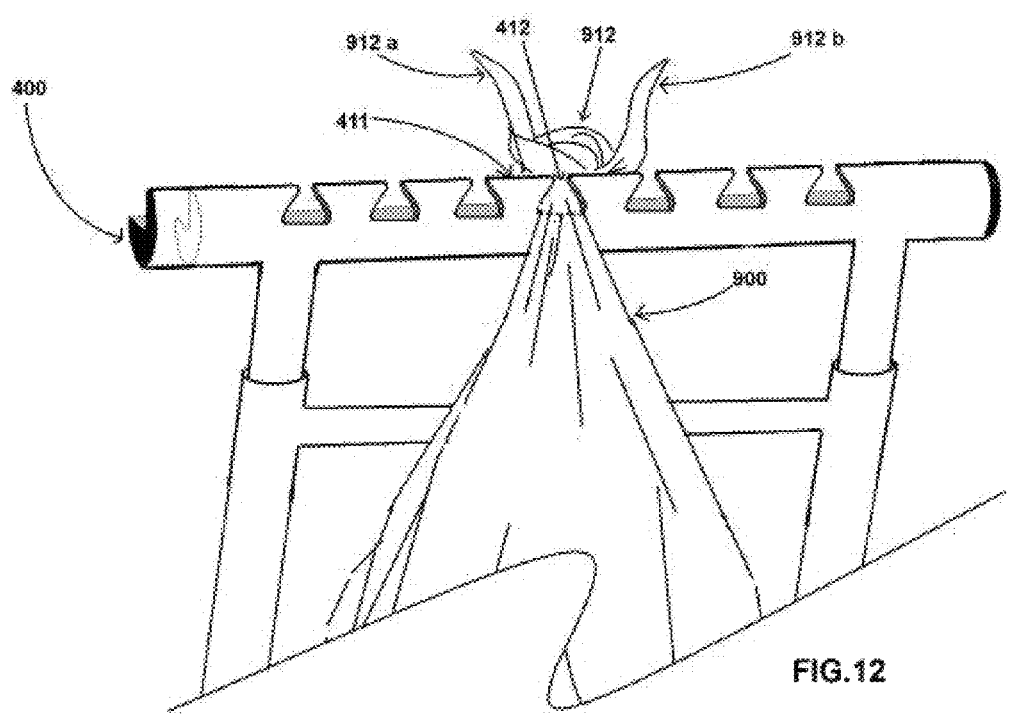
FIG. 12 is a sectional view showing a trash bag mounted by its knot grip between the projections of a hook member.
Figure 13:
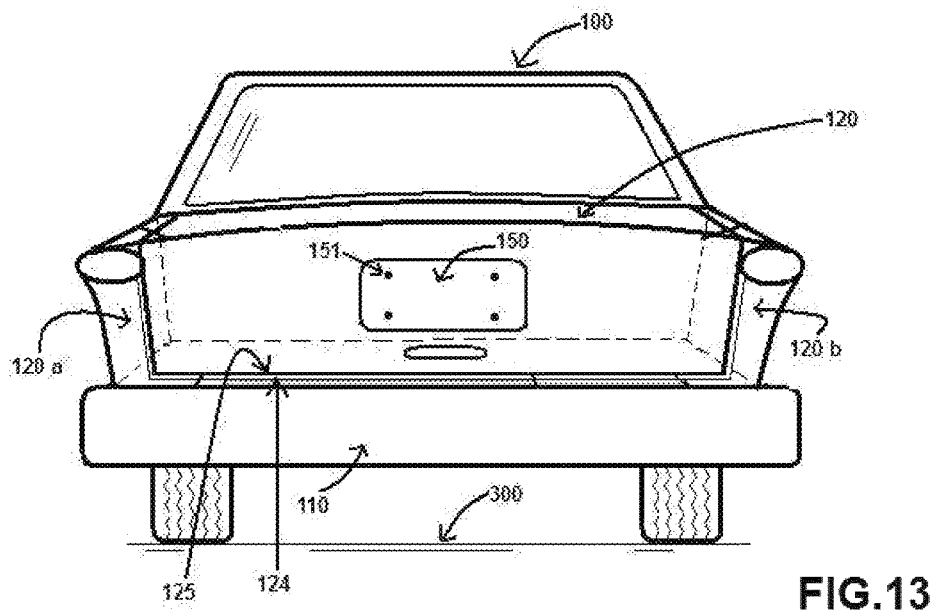
FIG. 13 is a rear view of a vehicle with a trunk and a license plate fixed on it.

In a first embodiment, the receiver segment 420 is attached to an engagement segment 510 of FIG. 1 using two long strips 514a and 514b and two short strips 514c and 514d at points 516a, 516b, 517a and 517b of the engagement segment and 518a, 518b, 519a and 519b of the receiver segment respectively. The long strips 514a and 514b attached to 510 are sufficiently angled so as to not obstruct mounting of the apparatus when the license plate on a vehicle is not vertical. The angle of inclination of the license plate from the vertical plane matches the angle of inclination of the long strips 514a and 514b. The engagement segment 510 is a rectangular frame with two vertical flat strips 511a and 511b and two horizontal flat strips 512a and 512b. The horizontal strips 512a and 512b each has one or more, preferably two, keyholes 513 which are aligned with the through holes 151 of a license plate 150 in FIG. 13. The keyholes comprise a lower circular portion and an upper elongated portion, and engage the shoulders of a shoulder bolt 530 in FIG. 2 which are configured to fix the license plate and support the apparatus on a vehicle. Choosing a sufficiently strong, rigid and inflexible shoulder bolt that would support the weight of the license plate, apparatus, and any trash bags mounted on it is ordinary skill in the art that does not require undue experimentation. While prior art methods have used bolts which are similar in appearance to a shoulder bolt, the bolts are not rigid and serve a different purpose. For example, U.S. Pat. No. 7,210,255 describes a padded license plate screw which is configured to absorb shocks. However, the padded screw may buckle under the weight of a rack, if an attempt is made to mount the rack on the padded screw. A shoulder bolt 530 is generally cylindrical and comprises a shoulder and a threaded section 533. The shoulder has an enlarged diameter section 531 and a reduced diameter section 532 whose length is greater than or equal to the thickness of the engagement segment 510. The diameter of the shoulder is greater than that of the threaded section 533 and also that of the through holes 151 of a license plate 150 of FIG. 13. The diameter of the circular portion of a keyhole is equal to or greater than the diameter of the enlarged diameter section 531 and the width of the elongated portion is equal to or larger than the width of the reduced diameter section 532. The width of the elongated portion of a keyhole 513 is smaller than the diameter of the enlarged diameter section 531 so as to keep the mounted apparatus from sliding off and disengaging the shoulders. In FIG. 13, the license plate 150 of a vehicle 100 is fixed by inserting the threaded section 533 of one or more shoulder bolts 530 through the through holes 151 in the license plate and screwing them into the threaded mounting holes in the vehicle. The keyholes 513 on the engagement segment 510 of the rack in FIG. 1 engage the shoulders of a shoulder bolt 530 such that the lower circular portions of the keyholes receive the enlarged diameter sections 531 of the bolts and the upper elongated portions slide down to rest on reduced diameter sections 532 of the bolts. However, one or more vehicle manufacturer supplied bolts that secure the license plate to the vehicle, or one or more high strength bolts, can replace one or more shoulder bolts to secure the license plate to the vehicle such that at least a portion of said one or more vehicle manufacturer supplied bolts, or one or more high strength bolts, is visible in addition to an already visible bolt head after the license plate has been fixed using one or more lock nuts. The bolt head and the visible neck portion between the lock nut and bolt head of a bolt serve as a shoulder. The rack is then removably fixed over the license plate on one or more vehicle manufacturer supplied bolts or high strength bolts. As show in FIG. 18, a lock nut 660 is first threaded on to a bolt 650 such that the length of the neck portion between the surface 661 of the lock nut and the bearing surface 651 of the bolt head is greater than or equal to the thickness of the engagement segment 510 in FIG. 1, and the length of the portion between the surface 662 of the lock nut and the threaded end 652 of the bolt is adequate to secure the license plate to the vehicle firmly enough to support the weight of the license plate and the apparatus. Choosing a sufficiently strong bolt that would support the weight of the license plate, apparatus and any trash bags that are mounted on it, and adequate length of the portion between the surface 662 of the lock nut and the threaded end 652 of the bolt are routine skill that does not require undue experimentation. The threaded end 652 is then inserted through the through hole 151 of the license plate 150 into the corresponding threaded mounting hole in the vehicle 100 in FIG. 13 by an adequate predetermined distance, followed by tightening the lock nut to secure the license plate. The keyholes 513 on the engagement segment 510 of the rack in FIG. 1 engage one or more vehicle manufacturer supplied or high strength bolts such that the lower circular portions of the keyholes receive bolt heads of the bolts 650 and the upper elongated portions slide down to rest on neck portion of the bolts. After the apparatus is configured, one or more trash bags are secured to one or more hook-shaped, tooth-shaped or claw-shaped projections of the hook member 400 as shown in FIG. 11 and FIG. 12, and the height of the hook member is adjusted so that the bottom 911 of the trash bags 900 does not touch the ground 300 in FIG. 13.

Figure 5:
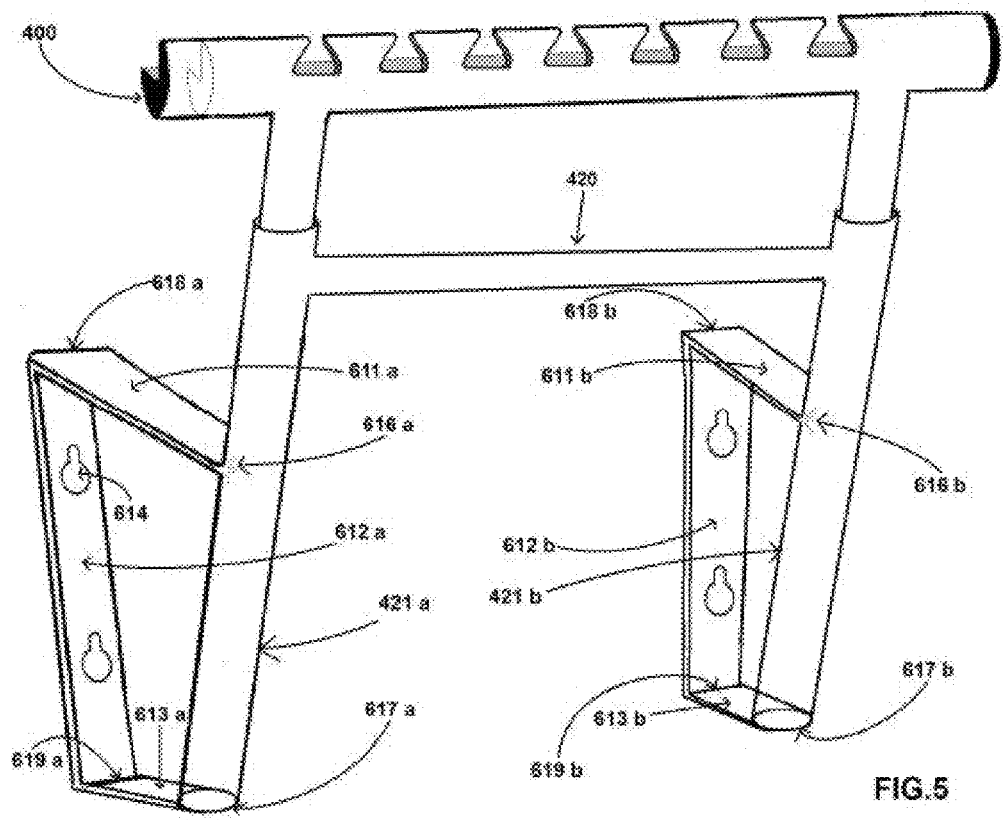
FIG. 5 is a side-angle view of a rack of a second embodiment with the hook member attached to the base member.

In a second embodiment, the receiver segment 420 is attached to an engagement segment (612a, 612b) of FIG. 5 using two long strips 611a and 611b and two short strips 613a and 613b at points 618a, 618b, 619a and 619b of the engagement segment and 616a, 616b, 617a and 617b of the receiver segment respectively. The long strips 611a and 611b attached to the engagement segment (612a, 612b) are sufficiently angled so as to not obstruct mounting of the apparatus when the license plate on a vehicle is not vertical. The angle of inclination of the license plate from the vertical plane matches the angle of inclination of the long strips 611a and 611b. The two vertical flat strips 612a and 612b of the engagement segment each has one or more, preferably two, keyholes 614 which are aligned with the shoulders 623 of an adapter 620 in FIG. 3. The keyholes comprise a lower circular portion and an upper elongated portion, and engage the shoulders of an adapter which is bolted atop a license plate to support the apparatus on a vehicle. Choosing a sufficiently strong, rigid and inflexible bolt that would support the weight of the license plate, apparatus and any trash bags that are mounted on it is ordinary skill in the art that does not require undue experimentation. An adapter 620 is a rectangular frame with two vertical flat strips 622a and 622b and two horizontal flat strips 621a and 621b. The horizontal strips 621a and 621b each has one or more, but preferably two, through holes 624 which are aligned with the through holes 151 of a license plate 150 in FIG. 13. The vertical strips 622a and 622b each has one or more, but preferably two, shoulders 623 which are welded or attached by other means to the adapter at 623c. A shoulder 623 is cylindrical and comprises an enlarged diameter section 623a and a reduced diameter section 623b whose length is greater than or equal to the thickness of the engagement segment (612a, 612b). The diameter of the circular portion of a keyhole is equal to or greater than the diameter of the enlarged diameter section 623a and the width of the elongated portion is equal to or larger than the width of the reduced diameter section 623b. The width of the elongated portion of a keyhole is smaller than the diameter of the enlarged diameter section 623a so as to keep the mounted apparatus from sliding off and disengaging the shoulders on the adapter. The adapter 620 in FIG. 3 and license plate 150 in FIG. 13 are both fixed to a vehicle 100 by inserting the threaded section 632 of one or more high strength bolts 630 in FIG. 4 through the through holes 624 in the adapter and 151 in the license plate, and screwing them into the threaded mounting holes in the vehicle. Alternatively, one or more vehicle manufacturer supplied bolts that secure the license plate to the vehicle can replace one or more high strength bolts to secure the license plate and adapter to the vehicle. The keyholes 614 on the engagement segment (612a, 612b) of the rack in FIG. 5 engage the shoulders 623 of the adapter such that the lower circular portions of the keyholes receive the enlarged diameter sections 623a of the shoulders and the upper elongated portions slide down to rest on reduced diameter sections 623b of the shoulders. After the apparatus is configured, one or more trash bags are secured to one or more hook-shaped, tooth-shaped or claw-shaped projections of the hook member 400 as shown in FIG. 11 and FIG. 12, and the height of the hook member is adjusted so that the bottom 911 of the trash bags 900 does not touch the ground 300 in FIG. 13.

Figure 6:
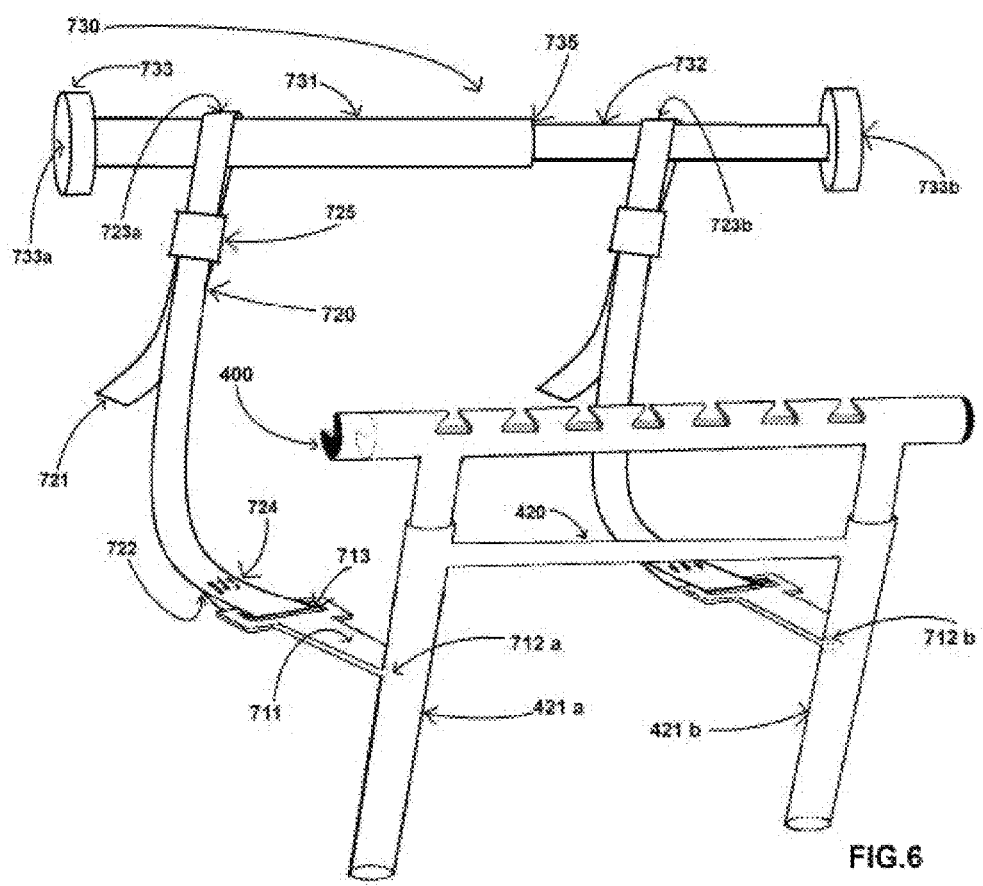
FIG. 6 is a side-angle view of a third embodiment. It shows a restraining bar, a rack with the hook member attached to the base member and a pair of adjustable straps that join the bar and the rack.

In a third embodiment, an engagement segment comprising one or more but preferably two long strips 711 is attached to the receiver segment 420. As shown in FIG. 6, one end of each strip 711 has a strap eyelet 713 and the other end is attached, preferably at about a 90 degree angle, to the receiver segment 420 at points 712a and 712b on rods 421a and 421b respectively. The eyelets 713 are wide enough for a strap 720 to pass through. One or more but preferably two waterproof straps 720, each having a proximal end 721 and a distal end 722, link the rack to the restraining bar 730. The straps are strong enough to support the rack, and any trash bags mounted on it, on the exterior of a vehicle. Also, the straps are thin enough to fit in the gap between the bottom 125 of the closed trunk door and bottom bridge 124 of the door frame of a vehicle 100 in FIG. 13. Nylon or polyester webbings are good examples of such a strap. The distal ends 722 of the straps are looped through the eyelets 713 of the flat strips 711 of the engagement segment and attached back to the straps 720 at 724 preferably with stitches, thereby securing the straps to the rack. The proximal ends 721 are looped around the restraining bar 730 at positions 723a and 723b, or any other suitable positions, and attached back to the strap 720 using buckles 725, thereby securing the straps to the restraining bar. The buckles are used for adjusting the length of the straps, and thereby the distance between the rack and restraining bar, by threading the straps through the buckles to loosen or tighten and locking the position. Cam buckles, belt buckles or web strap buckles made of plastic or metal are best suited for this purpose although other types of buckles can be used. An adjustable length restraining bar 730 is of the telescopic type comprising preferably two concentric elements 731 and 732. The maximum length of the bar 730 is equal to or greater than the width of the trunk 120 and the minimum length of the bar is lesser than or equal to the width of the trunk 120 of a vehicle 100 in FIG. 13. The diameter of the element 732 is lesser than that of 731 so that the length of the bar 730 can be adjusted by sliding 731 within 732 through the opening 735. A circular plate 733 is attached to each end of the bar for better surface contact. The plates are preferably rubber coated to maximize grip on and minimize any damage to the surfaces they are engaged to. The diameter of a plate 733 is preferably greater than or equal to the diameter of the corresponding concentric element the plate is attached to. An example of a restraining bar is a spring-loaded tension rod comprising an inner tube that slides within an outer tube. When the inner tube is pushed inside the outer tube, it compresses a spring creating tension that secures the rod in place by pushing the two tubes out against the surfaces it is engaged to. The restraining bar 730 is secured inside the trunk 120 of a vehicle 100 in FIG. 14 by adjusting its length such that the surfaces 733a and 733b of the circular plates 733 at the ends of the bar are firmly engaged to the side opposite walls 120a and 120b respectively of the inner trunk. By extending the straps 720 out over the bottom bridge 124 of the trunk door frame, the rack is suspended on the exterior of the vehicle. The straps are preferably adjusted to a minimal length required to keep the suspended rack from interfering with the opening and closing of the trunk door. While the trunk door can be closed, it is not necessary to do so for the apparatus to function. If the apparatus is used with the trunk door closed, it is not necessary to secure the restraining bar inside the trunk as the closed trunk door is enough to keep the bar from sliding off and disengaging the trunk. Therefore, any object strong enough to support the weight of the apparatus and big enough to not slip through the interface between a closed trunk door and vehicle frame can be used in lieu of the restraining bar. An example of such an object is a block of wood. After the apparatus is configured, one or more trash bags are secured to one or more hook-shaped, tooth-shaped or claw-shaped projections of the hook member 400 as shown in FIG. 11 and FIG. 12, and the height of the hook member is adjusted so that the bottom 911 of the trash bags 900 does not touch the ground 300 in FIG. 13.

Figure 7:
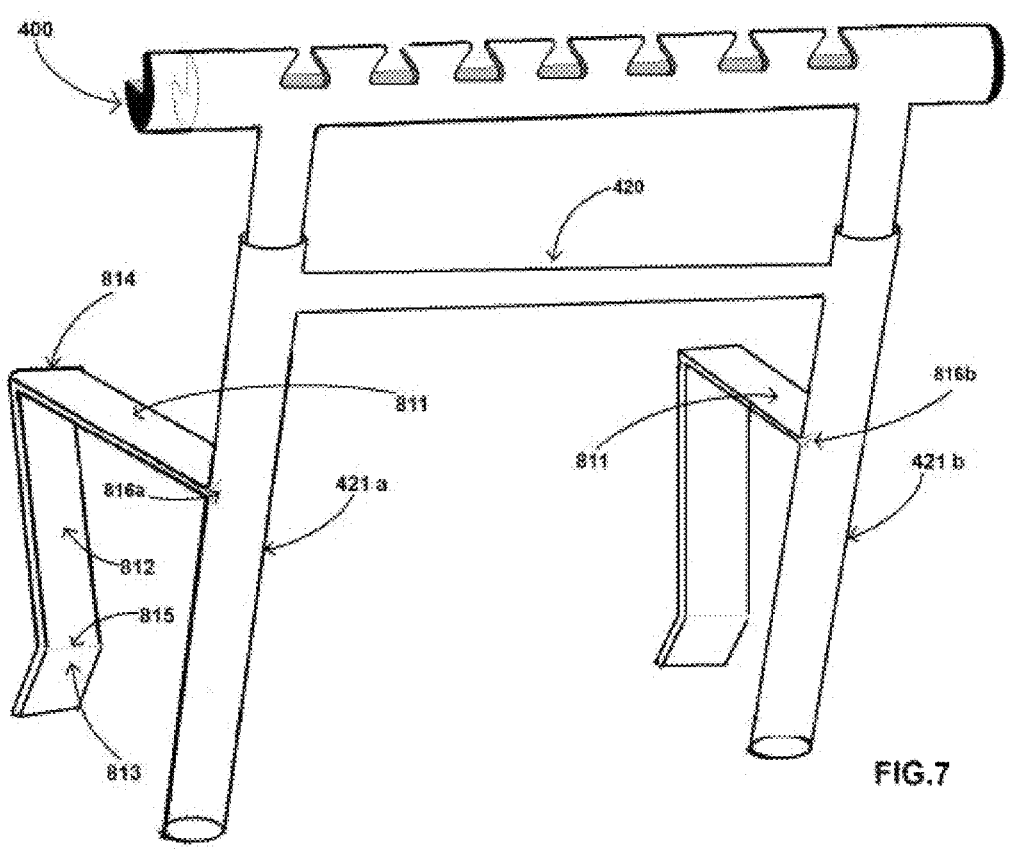
FIG. 7 is a side-angle view of a fourth embodiment with the hook member attached to the base member.

In a fourth embodiment, the receiver segment 420 is attached to an engagement segment comprising one or more, but preferably two, strong and resilient arms as shown in FIG. 7. Each arm comprises a horizontal portion 811 and a vertical portion which is preferably formed by two links 812 and 813 attached together at point 815 in a "V" shaped configuration measuring about 160 degrees. The vertical portion is attached to the horizontal portion at point 814 at an angle preferably between 75 and 90 degrees such that the tip 815 of the 'V' shaped configuration points towards the corresponding vertical rod 421a or 421b of the receiver segment 420 the horizontal portion is attached to. Alternatively, each arm can be a long strip bent at points 814 and 815 in a zigzag fashion into portions 811, 812 and 813. The horizontal portions 811 of the two arms are attached to rods 421a and 421b of the receiver segment 420 at points 816a and 816b respectively such that the open ends of the vertical portions are pointing in a direction opposite to that of the hook member 400. The arms are strong and resilient enough to cause the vertical portion to spring back to its original position when stretched apart from the receiver segment. The apparatus in FIG. 7 is mounted on the external spare wheel 210 of a vehicle 200 in FIG. 14 such that the arms sit on the circumference of the wheel. The width of the horizontal portion 811 of an arm is greater than or equal to the width 212 of the external spare wheel 210 of a vehicle 200 in FIG. 14. The link 812 of the vertical portion of an arm is long enough to cover the span of the external spare wheel of a vehicle. The link 813 of the vertical portion is preferably shorter than the link 812 and serves to ease the arm on to the wheel when mounting the apparatus. The width of the gap between the joint 815 of a vertical portion and the corresponding rod of the receiver segment 420 the arm is attached to is equal to or preferably lesser than the width 212 of the external spare wheel. After the apparatus is configured, one or more trash bags are secured to one or more hook-shaped, tooth-shaped or claw-shaped projections of the hook member 400 as shown in FIG. 11 and FIG. 12, and the height of the hook member is adjusted so that the bottom 911 of the trash bags 900 does not touch the ground 300 in FIG. 14.

Figure 19:
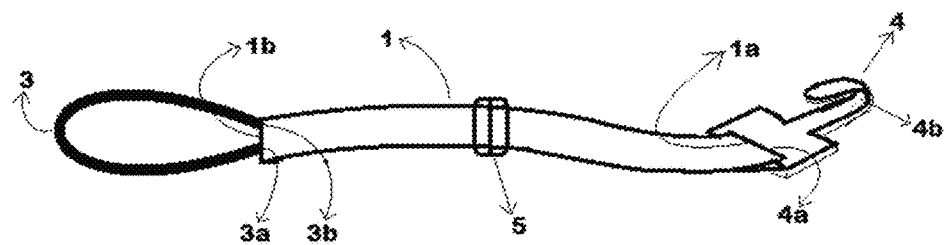
FIG. 19 is a side-angle view of a fifth embodiment. It shows an engagement loop, a hook member and an adjustable strap connecting both.
Figure 22:
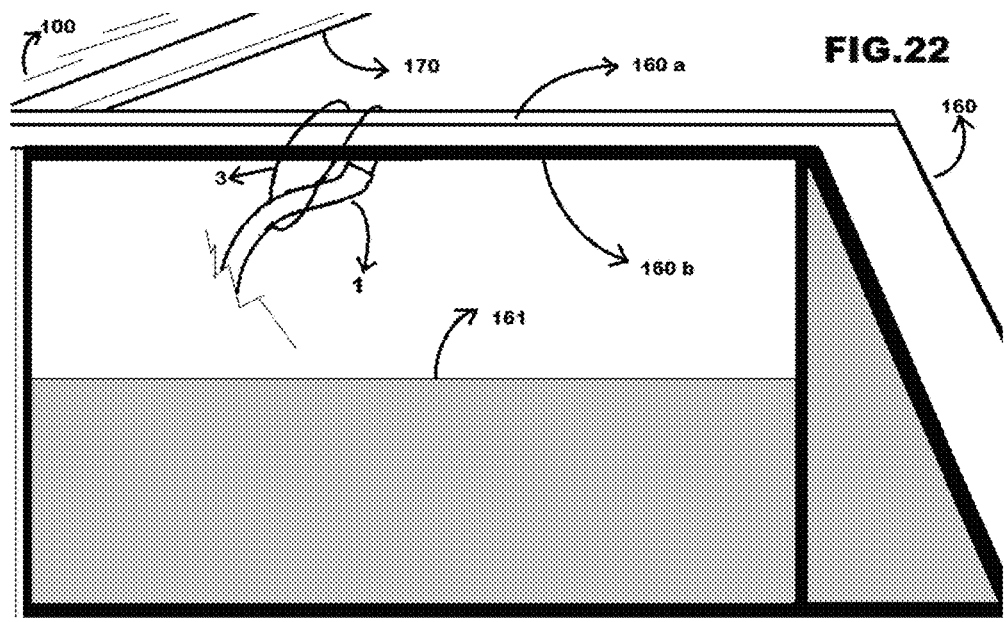
FIG. 22 is a side-angle partial view showing only the proximal end portion of a fifth embodiment and how the engagement loop is configured by way of a cow-hitch knot to a door frame of a vehicle.
Figure 23:
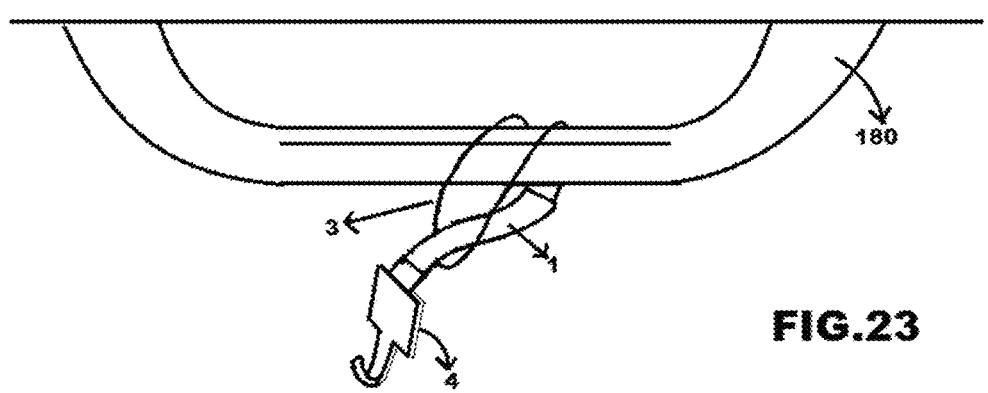
FIG. 23 is a side-angle view showing how a fifth embodiment is attached by way of a cow-hitch knot to a grab handle of a vehicle.
Figure 24:
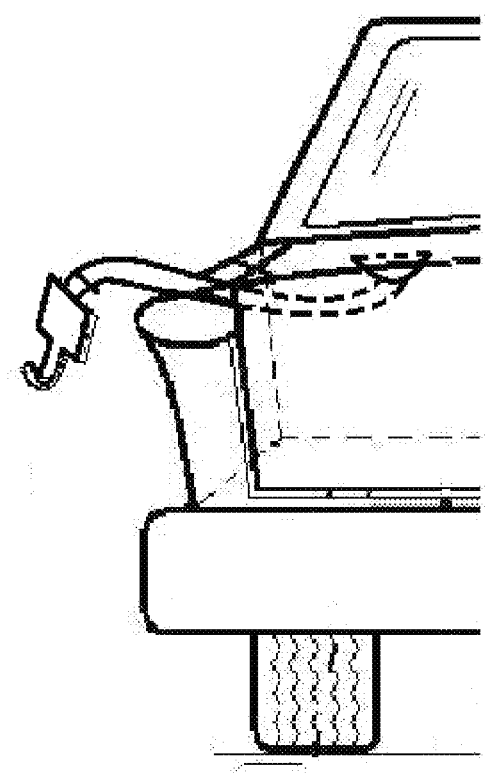
FIG. 24 is a side view showing how a fifth embodiment comprising a strap whose proximal end is attached to a vacuum suction cup which is secured inside a vehicle to the underside of a trunk lid (fixing means) on a vehicle chassis element.
Figure 25:
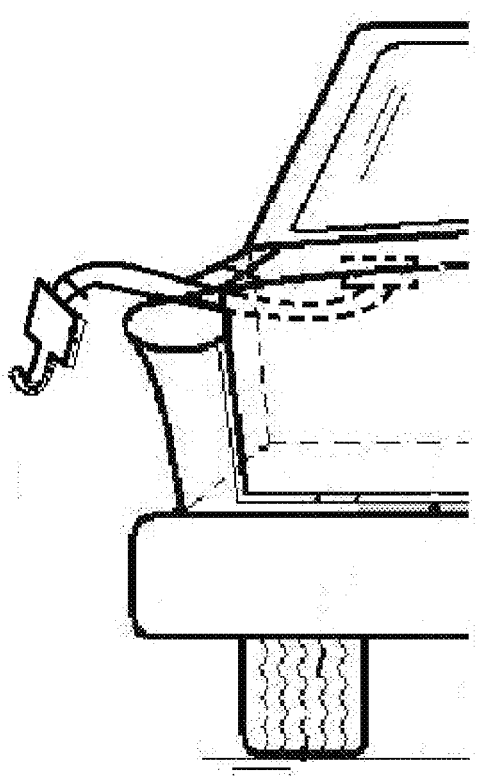
FIG. 25 is a side view showing how a fifth embodiment comprising a strap whose proximal end is attached to a magnet which is secured inside a vehicle to the underside of a trunk lid (fixing means) on a vehicle chassis element.
Figure 26:
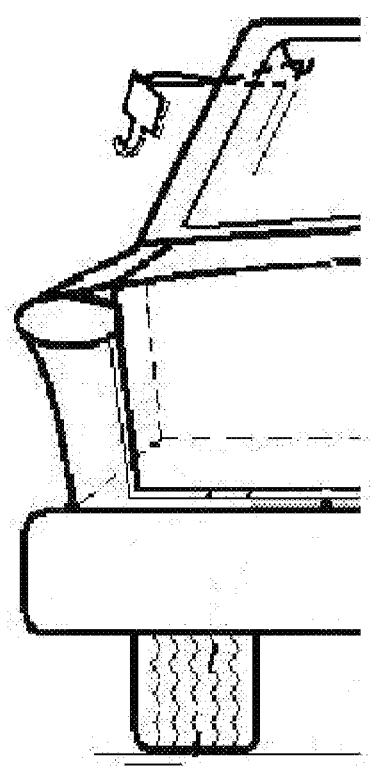
FIG. 26 is a side view showing how a fifth embodiment comprising a loop string whose proximal end is secured to a coat hanger (fixing means) located inside a vehicle on a vehicle chassis element.
Figure 27:
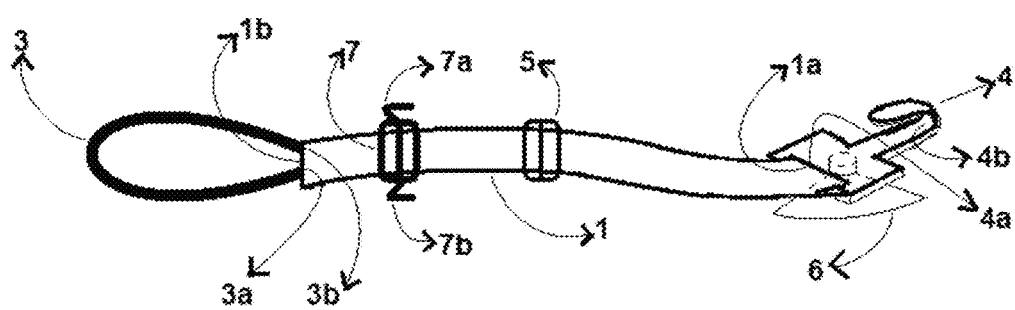
FIG. 27 is a side-angle view of a fifth embodiment comprising an engagement loop, a hook member, with a suction cup attached, and an adjustable strap connecting both. The figure also shows an adjustable loop-lock which locks or stops a portion of a cow-hitch knot.
Figure 28:
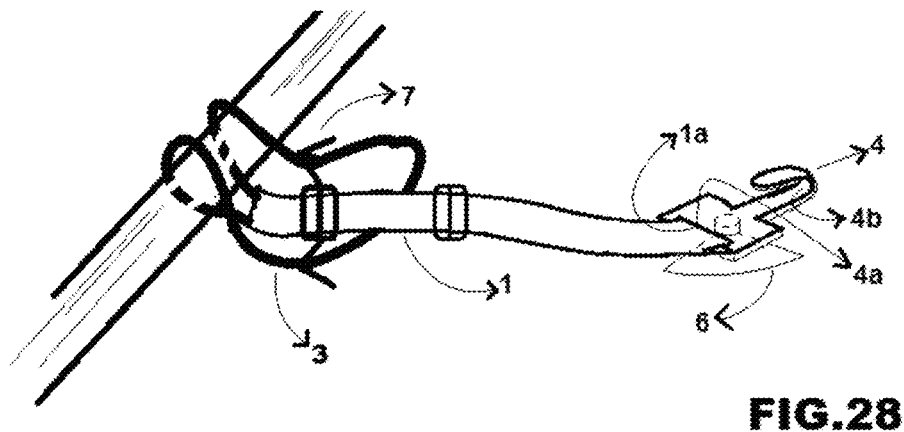
FIG. 28 is a side-angle view of a fifth embodiment showing how an engagement loop is configured into a cow-hitch knot around a door frame (fixing means) of a vehicle. It also shows how a portion of a cow-hitch knot is locked into an adjustable loop-lock.
Figure 29:
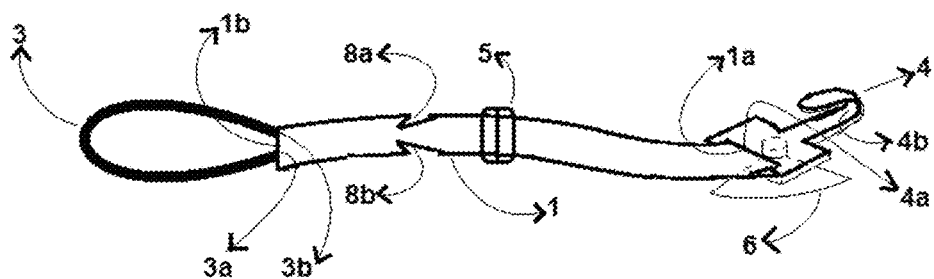
FIG. 29 is a side-angle view of a fifth embodiment showing a variant of a loop-lock in the form of two V-shaped notches.
Figure 30:
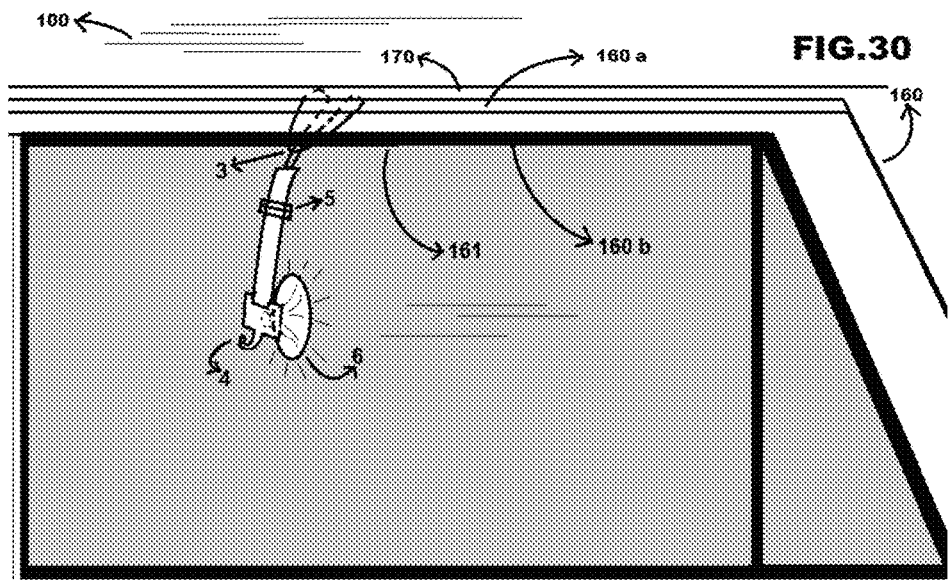
FIG. 30 is a side-angle view showing a cow-hitch knot configured around a door frame of a vehicle and a portion of the cow-hitch knot sandwiched, trapped and immobilized between a door frame and a main body frame and between the doorframe and a window glass of the vehicle. It also shows a hook member secured to a window glass using a vacuum suction cup.
Figure 31:
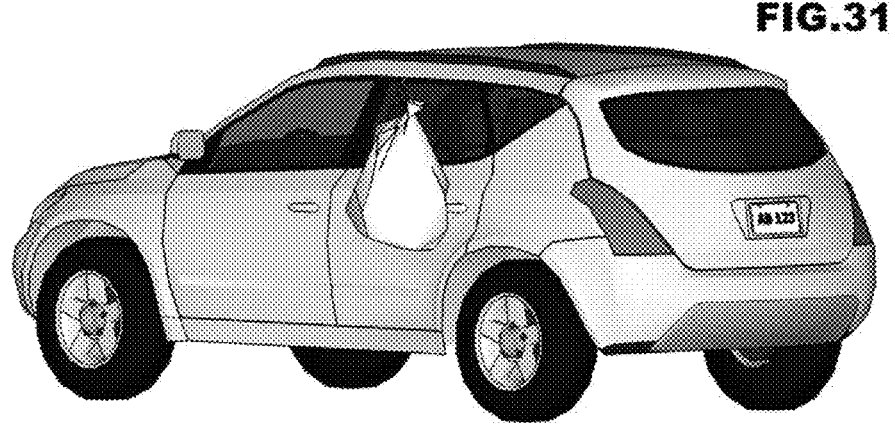
FIG. 31 is a full side-angle view showing a vehicle and a fifth embodiment configured around a door frame (fixing means) of the vehicle using a cow-hitch knot and a trash bag mounted on to a hook member of the apparatus.

In a fifth embodiment as shown in FIG. 27, the apparatus includes one or more but preferably one adjustable length waterproof strap 1 with a distal end 1a and a proximal end 1b. An engagement loop is formed using a thin but strong string 3 whose two ends 3a and 3b are attached, preferably with stitches, to the proximal end 1b of the strap 1. It is however, not necessary to permanently attach the engagement loop to the strap 1. It is possible that the engagement loop is releasably attached to the strap, say, by using hook-and-loop fasteners among other methods. A loop-lock 7 is used for adjusting shape, size and the tightness of a cow-hitch knot around a fixing means by stopping or locking a portion of engagement loop into the loop-lock (forming a closed shape) which can be adjusted to a desired position. One example of a loop-lock is a web-strap buckle 7 which is made of plastic and is flanked by two V-shaped arms 7a and 7b on both sides along the breadth of the buckle 7 such that the convergent tips of the V-shaped arms are pointed towards the proximal end of the strap. Either the two arms 7a and 7b could be welded to the buckle or the buckle could be molded as a unitary body with the arms. The distal end 1a of the strap 1 is threaded through the loop-lock web-strap buckle which can be adjusted to a desired position. Alternatively, as shown in FIG. 29, the loop-lock can be one or more V-shaped or U-shaped notches, such as 8a and 8b, on the sides of the strap 1 into which a portion (of the engagement loop) of the cow-hitch knot can lock into. The inside edges of the notches 8a and 8b could be fitted or lined with metal or rubber-coated plastic to make it stronger. A buckle 5 as shown in FIG. 27 is used for adjusting the length of the strap 1, and thereby the distance between the engagement loop and the hook member 4. The distal end 1a of the strap 1 is threaded through the buckle 5 which may be adjusted as desired to increase or decrease the length of the strap 1 and locking it in position. Cam buckles, belt buckles or web strap buckles made of plastic or metal are best suited for this purpose although other types of buckles can be used. The distal end 1a of the strap 1 is then looped through an eyelet 4a of a hook member 4 and attached back to the strap, preferably with stitches, thereby securing the hook member to the strap at the distal end. It is not necessary that the hook member 4 is permanently attached to the strap 1 with stitches. The hook member can be releasably attached to the strap using, for instance, by a hook-and-look fastener among other methods. The eyelet 4a is wide enough for a strap 1 to pass through. The hook member 4 preferably has one hook and is provided with a vacuum suction cup 6 which is preferably welded to a surface of the hook member that is opposite to the surface the hook is bent towards. The engagement loop 3 of the apparatus is big enough to allow a hook member 4 to pass through it. The engagement loop is thin enough to pass through small holes, if any in the vehicle, using which the apparatus can be secured. The strap 1 and the string 3 are strong enough to support the hook member, and any trash bags mounted on it, on the exterior of a vehicle. The strap 1 and the string 3 in FIG. 27 are thin enough to snugly fit between a door frame 160a and a main body frame 170 of a vehicle 100 as shown in FIG. 30 so as to not interfere with the opening and closing operations of a door. The strap 1 and the string 3 are also thin enough to snugly fit between a window glass top 161 and a top underside of the window frame 160b of a door of a vehicle 100 in FIG. 30 so as to not interfere with the opening and closing operations of a window glass. Further, the strap 1 and the string 3 are thin enough to maintain the weatherproofing seal between the door frame 160a and the main body 170 and between the window glass top 161 and the window frame 160b in FIG. 30. Furthermore, the linear length of strap 1 and string 3 when combined together is sufficient enough to extend outside the vehicle. Nylon or polyester webbings, cotton or jute are good examples of the materials used for such a string and a strap. FIG. 22 shows a portion of the apparatus comprising an engagement loop 3 and a strap 1 and how a cow-hitch knot (structure) configuration starts out around a door frame of a vehicle 100 such that the engagement loop and the strap are wound around the top portion of the door frame 160, either above or under the weatherproof seal if present, with the strap 1 pulled through the engagement loop 3. FIG. 28 shows how a portion of the cow-hitch knot is locked into or locked around an optional loop-lock 7 which allows control over the shape, size and tightness of the cow-hitch knot around the door frame 160 (fixing means). The loop-lock can be adjusted along the length of the strap 1 or the engagement loop string 3 without untying or undoing the cow-hitch knot. FIG. 29 shows another mechanism of a loop-lock which comprises on or more V-shaped or U-shaped notches 8a and 8b on the strap 1. A portion (of the engagement loop) of the cow-hitch knot can be locked into these notches after the cow-hitch knot is configured. FIG. 30 shows the apparatus without the loop-lock where the cow-hitch knot is allowed to fully and firmly tighten around the door frame. It further shows how the hook member 4 with a vacuum suction cup 6 is secured to the window glass so as to minimize any undesired vertical or lateral movements of the apparatus when the vehicle is in motion or otherwise. FIG. 23 shows the apparatus of FIG. 19 attached to a grab handle 180 of a vehicle such that the engagement loop and the strap are wound around the grab handle with the hook member 4 pulled through the engagement loop 3, connected to the proximal end of the strap, into a cow-hitch knot until a firm knot is formed. In this configuration, the hook member 4 and the strap 1 are on the inside of the vehicle. The hook member 4 is extended out of the vehicle such that a portion of the strap is positioned preferably between the door frame 160a and the main body 170 or between the window glass top side 161 and the inside portion 160b of the window frame of the vehicle in FIG. 22. Further, the apparatus may be also operated by attaching the engagement loop, or its equivalent, to an object that is sufficiently strong and detached from a vehicle itself. An example of such a detached object is a restraining bar 730 in FIG. 6 that was used in the third embodiment. Another example is a block of wood. The engagement loop, or its equivalent, that is secured to the detached object is positioned inside the vehicle and the hook member, or its equivalent, is positioned on the outside such that a portion of the strap is positioned between the body frame and the corresponding part of the vehicle, such as a trunk door, passenger door or a driver side door, based on where the apparatus is configured. After the apparatus is configured, one or more trash bags are secured to one or more hook-shaped, tooth-shaped or claw-shaped projections of the hook member 400 as shown in FIG. 11 and FIG. 12 or a hook member 4 in FIG. 30 and the height of the hook member is adjusted (using buckle 5 in FIG. 30) so that the bottom 911 of the trash bags 900 does not touch the ground 300 in FIG. 13. If the draw strings of the trash bag are too long, then one of the following could be done. One, the length of the draw strings can be reduced to the desired length by tying the draw strings into a knot. Two, the trash bag may be secured, directly without using the apparatus, around a grab handle or door handle or other fixing means by way of a cow-hitch knot.

Figure 20:
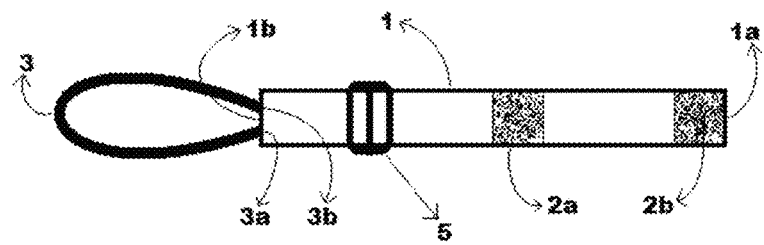
FIG. 20 is a view from the top of a variation of a fifth embodiment. It shows an engagement loop attached to one end of an adjustable strap and a hook-and-loop fastener to the other end of the strap.
Figure 21:
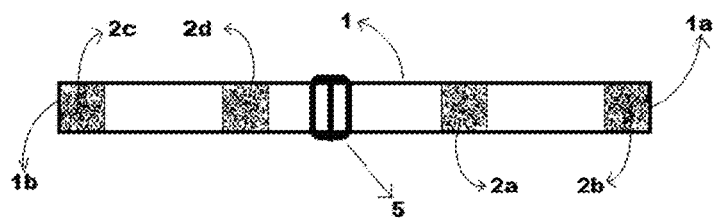
FIG. 21 is a view from the top of another variation of a fifth embodiment. It shows an adjustable strap with hook-and-loop fastener on both ends of the strap.

While several alterations to the fifth embodiment are possible, two of them are presented in FIG. 20 and FIG. 21 as examples. In FIG. 20, the hook member 4 is substituted with a sufficiently strong pair of hook-and-loop fastener (2a and 2b) which when attached together form a holding loop that can hold trash bags. In FIG. 21, the apparatus has a pair of sufficiently strong hook-and-loop fastener on both the distal end (2a and 2b) and the proximal end (2c and 2d). In another alteration, the strap can be eliminated completely such that the embodiment comprises of an engagement loop and a hook member. In yet another alteration, the proximal end, distal end and middle portion are combined into a single rigid S-shaped or C-shaped strip, wherein said proximal end of said S-shaped or C-shaped strip is secured on the outside of said vehicle either to a permanently or releasably fixed means, wherein said distal end of said S-shaped or C-shaped strip comprises one or more means for holding bags or holding displays outside said vehicle.

The apparatuses of the embodiments described may alternatively be molded or otherwise formed as a unitary body without having to assemble individual parts or components as has been described. The apparatuses can be constructed of metals or plastics including aluminum, polyvinyl chloride (PVC), acrylonitrile butadiene styrene (ABS), high density polyethylene (HDPE) or any other material of suitable strength, weight and corrosion resistance properties. The apparatuses can also be made of hardwood applied with heat and water resistant coatings.

The foregoing is considered as illustrative only of the principles of the invention. Furthermore, since numerous modifications and changes will readily be obvious to those skilled in the art, it is not desired to limit the invention to the exact construction and operation shown and described. While the preferred embodiments have been described, the details may be changed without departing from the invention, which is defined by the claims.

What is claimed is:

1. An apparatus in combination with a trash bag and a vehicle comprising:
    a looped string with a proximal end and a distal end;
    a strap with a proximal end and a distal end;
    wherein said distal end of said looped string is attached to and makes direct contact with said proximal end of said strap;
    wherein said proximal end of said looped string is secured to a door frame of said vehicle by tying a cow-hitch knot on to said door frame;
    wherein a hook member is secured to said distal end of said strap;
    wherein said trash bag is attached to said hook member which is positioned outside said vehicle;
    wherein said apparatus further comprising a buckle with two arms;
    wherein a portion of said looped string locks around said arms of said buckle forming a closed shape, and
        wherein the size, shape and tightness of said closed shape around said door frame can be adjusted without untying or undoing said cow hitch knot.
2. The apparatus of claim 1 wherein said buckle further comprising a hook that anchors on to said door frame.
3. The apparatus of claim 1 wherein said apparatus further comprising a vacuum suction cup to minimize any undesired vertical or lateral movements of said apparatus.
4. The apparatus of claim 1 wherein said apparatus further comprising a magnet to minimize any undesired vertical or lateral movements of said apparatus.

* * * * *